United States Patent
Singh et al.

(10) Patent No.: US 10,604,071 B2
(45) Date of Patent: *Mar. 31, 2020

(54) AUXILIARY VEHICLE LIGHTING CONTROL SYSTEM

(71) Applicant: HOPKINS MANUFACTURING CORPORATION, Emporia, KS (US)

(72) Inventors: Iqbal Singh, Buffalo Grove, IL (US); Chris Connington, Long Grove, IL (US)

(73) Assignee: Hopkins Manufacturing Corporation, Emporia, KS (US)

(*) Notice: Subject to any disclaimer, the term of this patent is extended or adjusted under 35 U.S.C. 154(b) by 0 days.

This patent is subject to a terminal disclaimer.

(21) Appl. No.: 16/356,203

(22) Filed: Mar. 18, 2019

(65) Prior Publication Data

US 2019/0210524 A1 Jul. 11, 2019

Related U.S. Application Data

(63) Continuation of application No. 15/794,898, filed on Oct. 26, 2017, now Pat. No. 10,315,567.

(60) Provisional application No. 62/413,799, filed on Oct. 27, 2016.

(51) Int. Cl.
| | |
|---|---|
| *B60Q 11/00* | (2006.01) |
| *B60Q 1/00* | (2006.01) |
| *B60Q 1/18* | (2006.01) |
| *B60Q 1/26* | (2006.01) |

(52) U.S. Cl.
CPC .......... *B60Q 11/005* (2013.01); *B60Q 1/0076* (2013.01); *B60Q 1/0088* (2013.01); *B60Q 1/18* (2013.01); *B60Q 1/2611* (2013.01); *B60Q 2900/30* (2013.01)

(58) Field of Classification Search
None
See application file for complete search history.

(56) References Cited

U.S. PATENT DOCUMENTS

| | | | | |
|---|---|---|---|---|
| 2002/0163450 A1* | 11/2002 | Flick | ...................... | B60R 25/04 340/988 |
| 2003/0080621 A1* | 5/2003 | Kirk | ...................... | H02H 3/087 307/10.7 |
| 2017/0166067 A1* | 6/2017 | Panopoulos | ............ | F21V 14/02 |

* cited by examiner

*Primary Examiner* — Crystal L Hammond
(74) *Attorney, Agent, or Firm* — Hovey Williams LLP

(57) ABSTRACT

An auxiliary vehicle lighting system is provided for use in a vehicle having an engine and an electrical system. The auxiliary vehicle lighting system has at least one auxiliary vehicle light; a control hub, connected to the vehicle electrical system and to each auxiliary vehicle light; and a system shut down function or program, connected to the control hub and configured to de-energize the auxiliary lighting system. The control hub is constructed and arranged so that upon illumination of the auxiliary vehicle lights and with the engine turned off, the vehicle battery voltage is monitored. If the battery voltage reaches a designated low voltage target, the system shut down function or program is activated, which de-energizes the auxiliary lights.

18 Claims, 25 Drawing Sheets

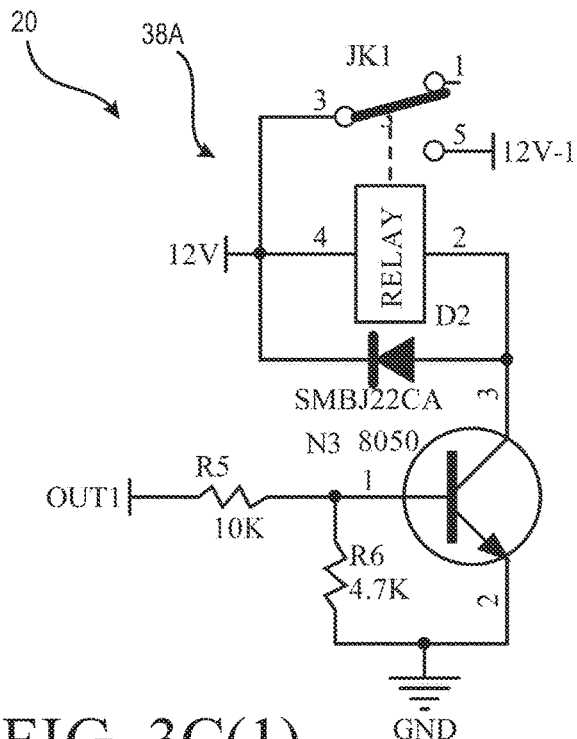
FIG. 3C(1)
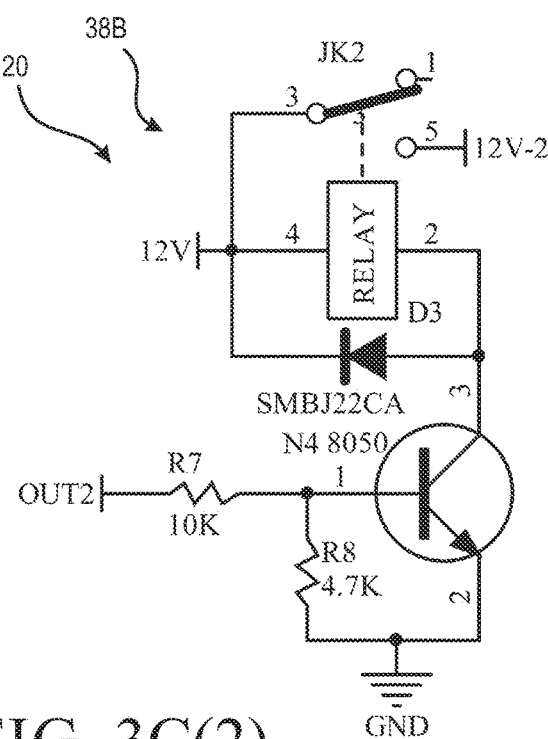
FIG. 3C(2)
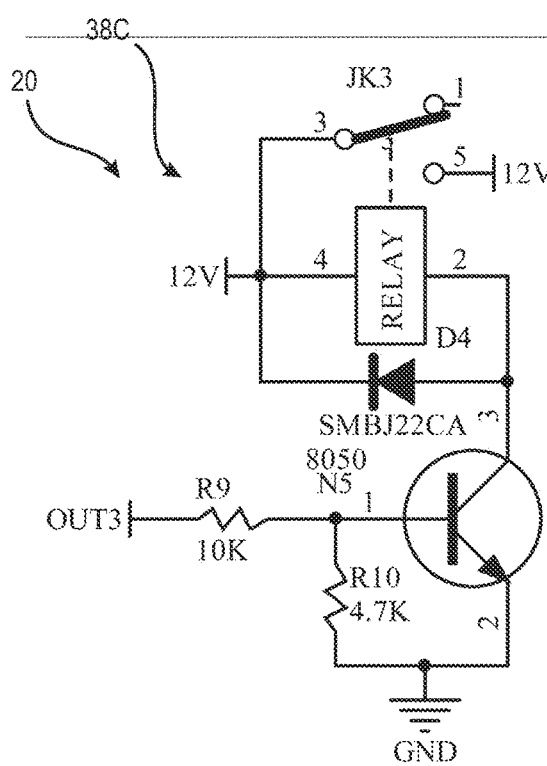
FIG. 3C(3)
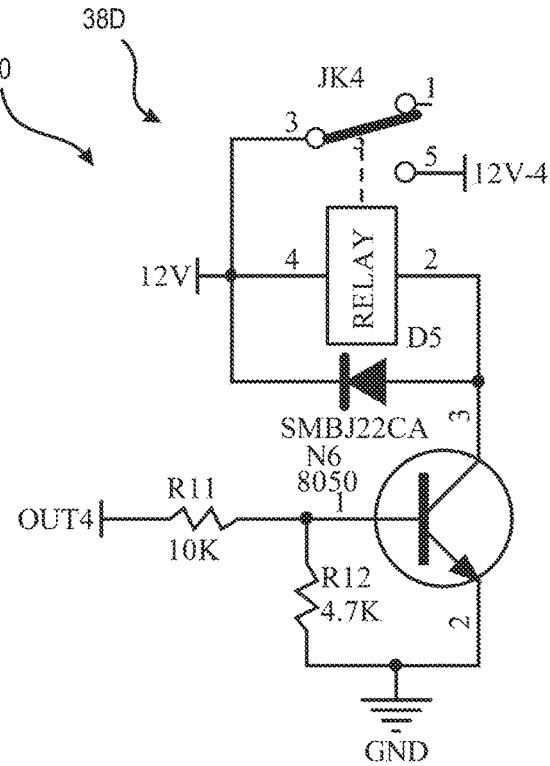
FIG. 3C(4)

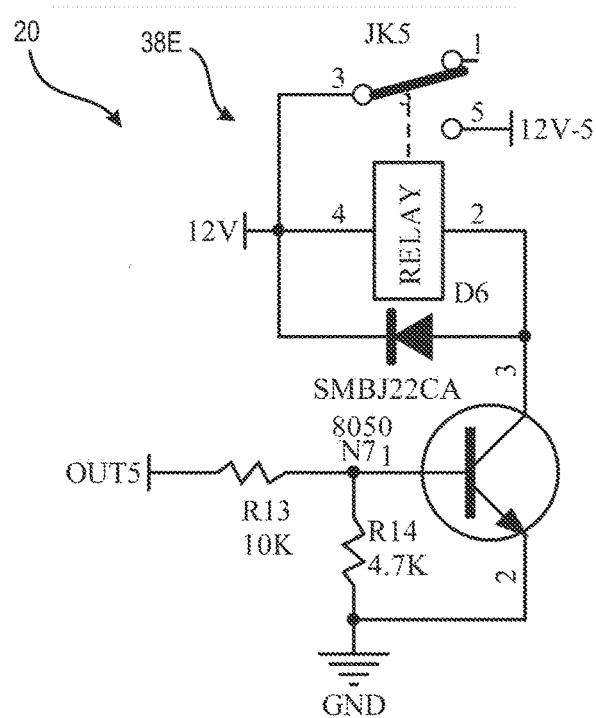
FIG. 3D(1)
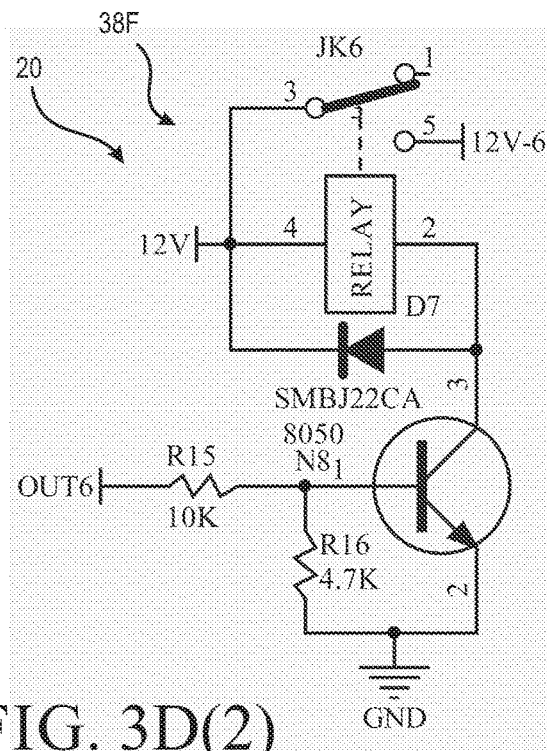
FIG. 3D(2)
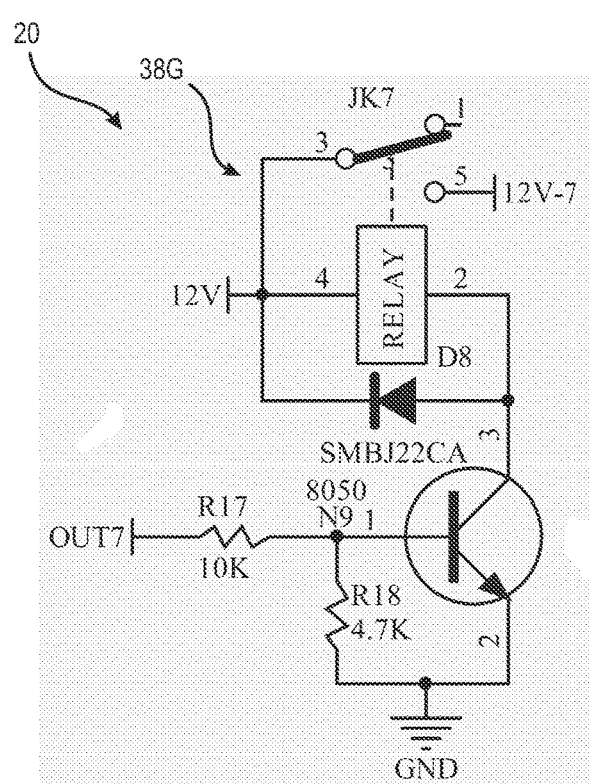
FIG. 3D(3)
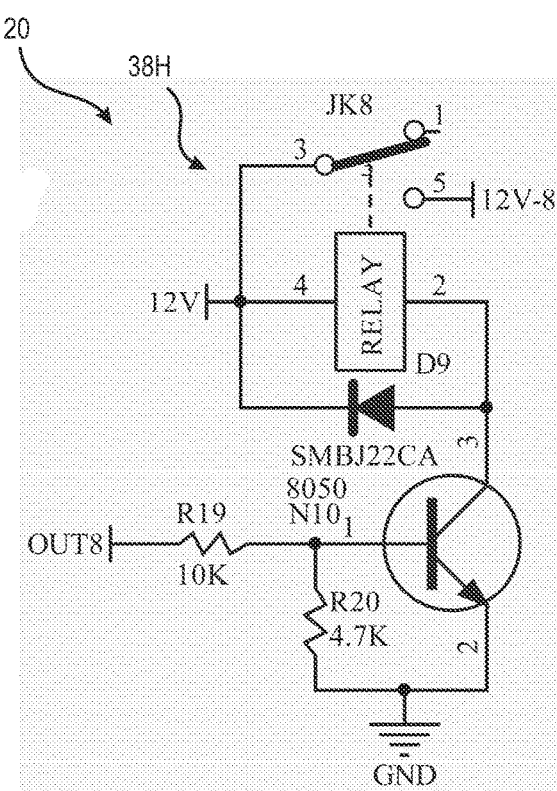
FIG. 3D(4)

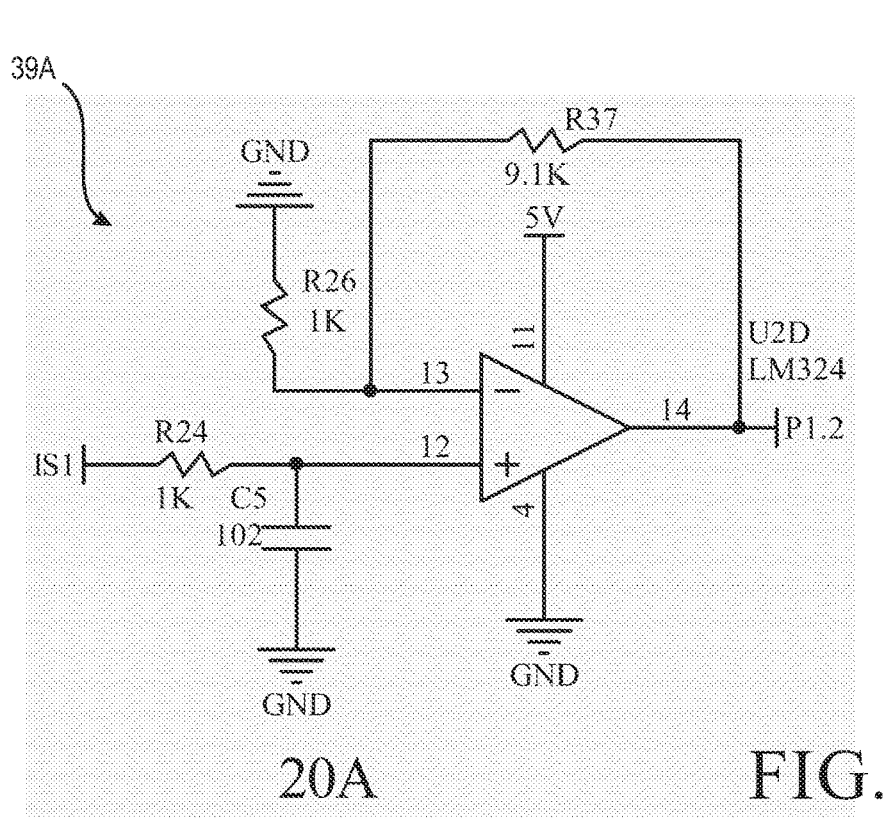
FIG. 3E(1)
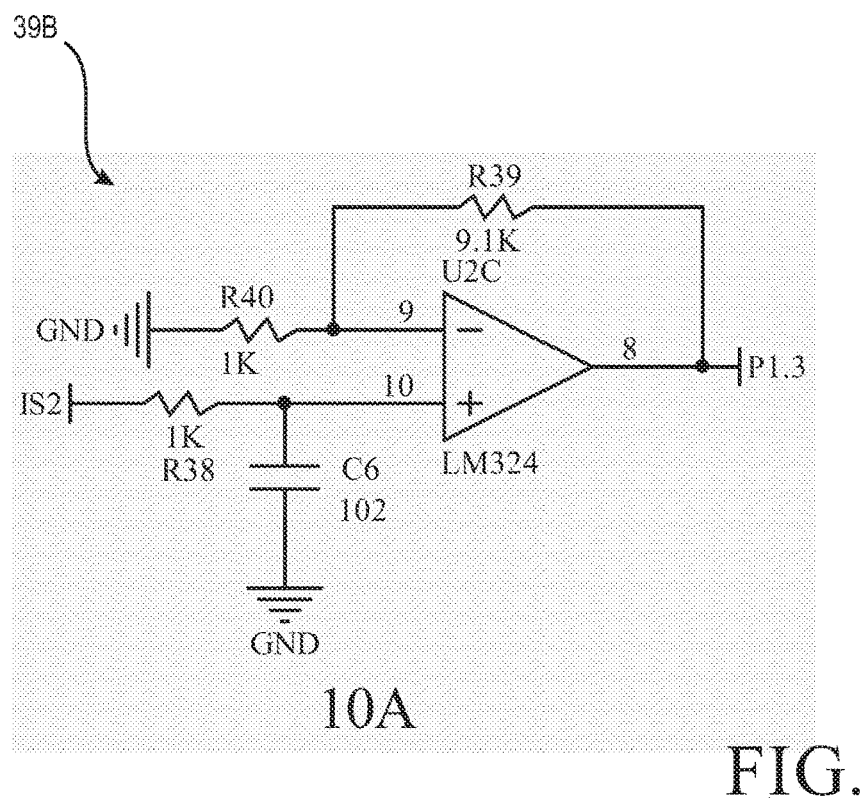
FIG. 3E(2)

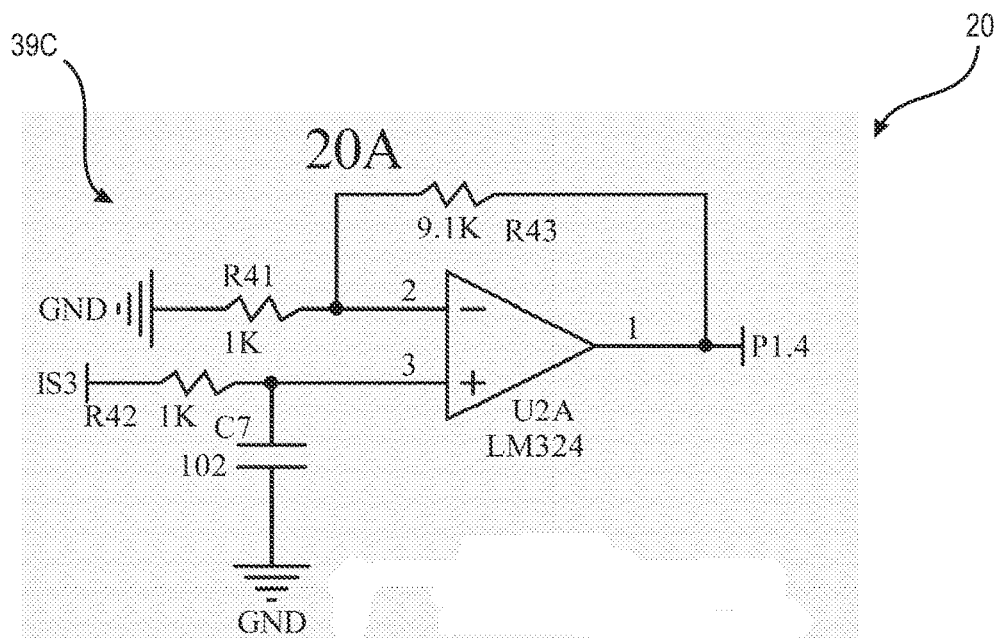
FIG. 3F(1)
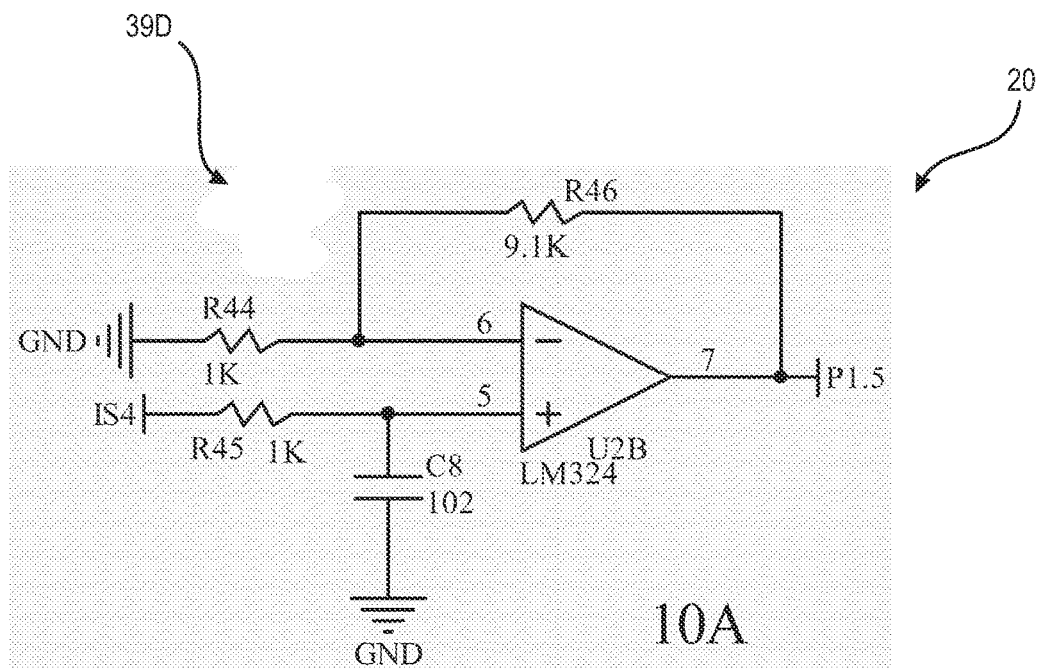
FIG. 3F(2)

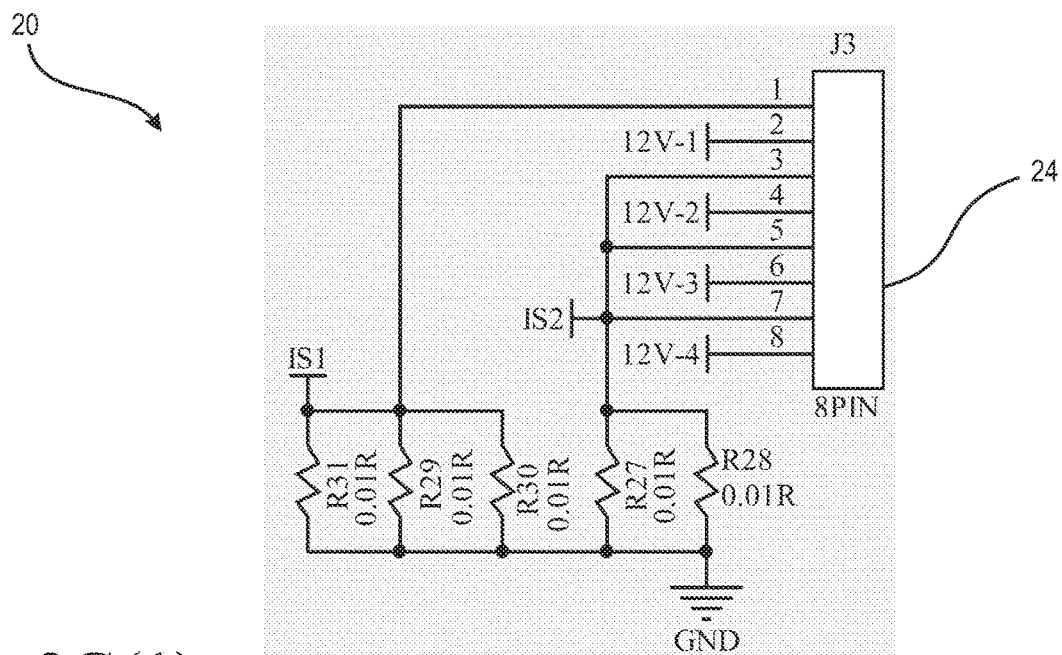
FIG. 3G(1)
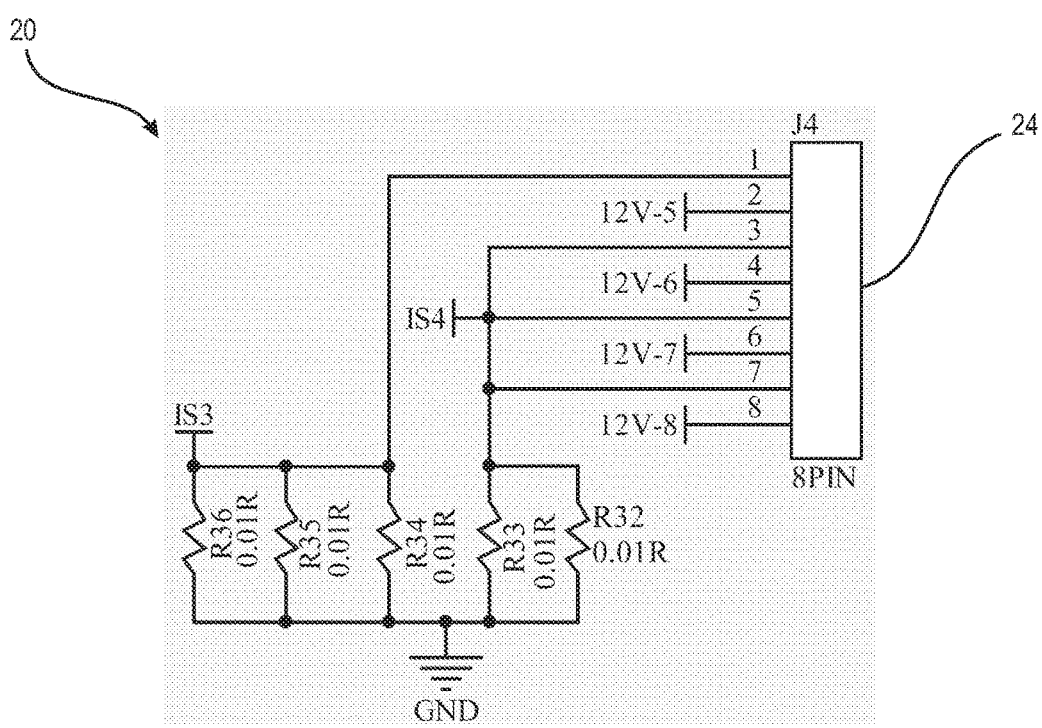
FIG. 3G(2)

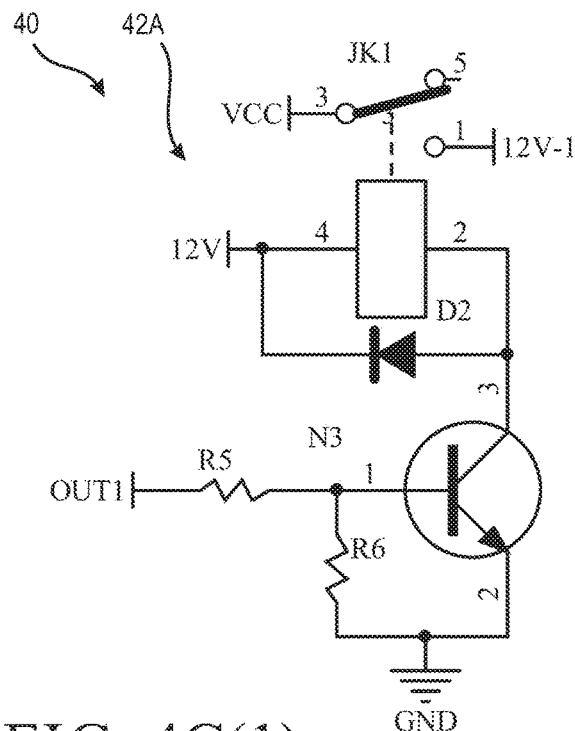
FIG. 4C(1)
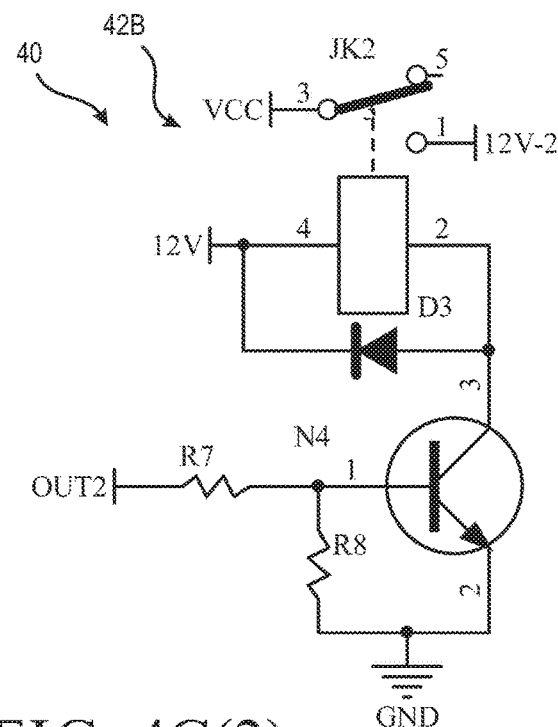
FIG. 4C(2)
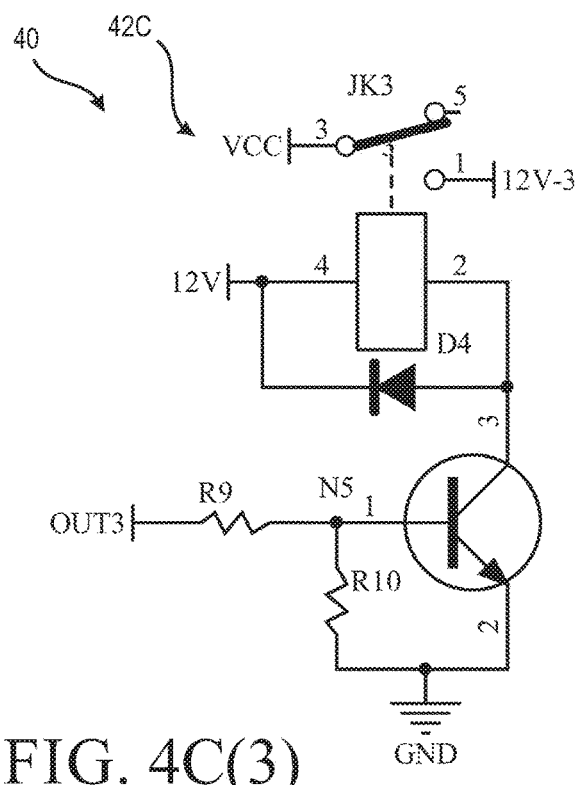
FIG. 4C(3)
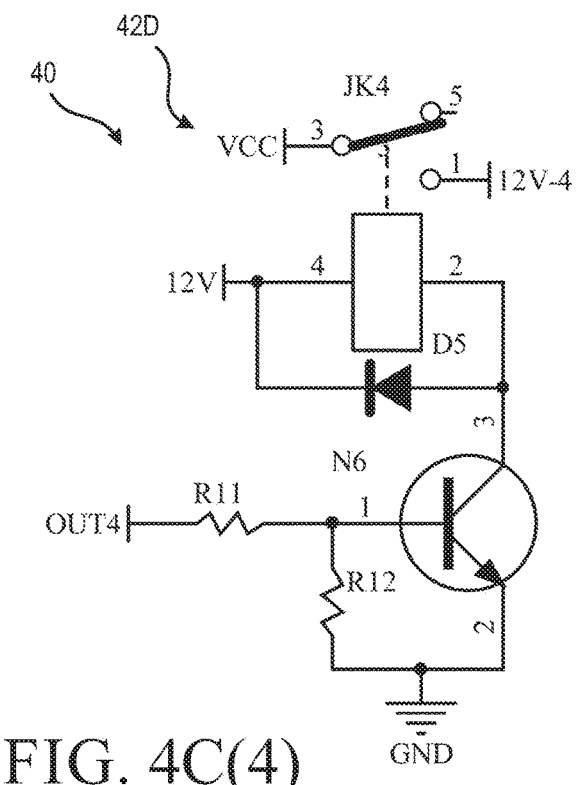
FIG. 4C(4)

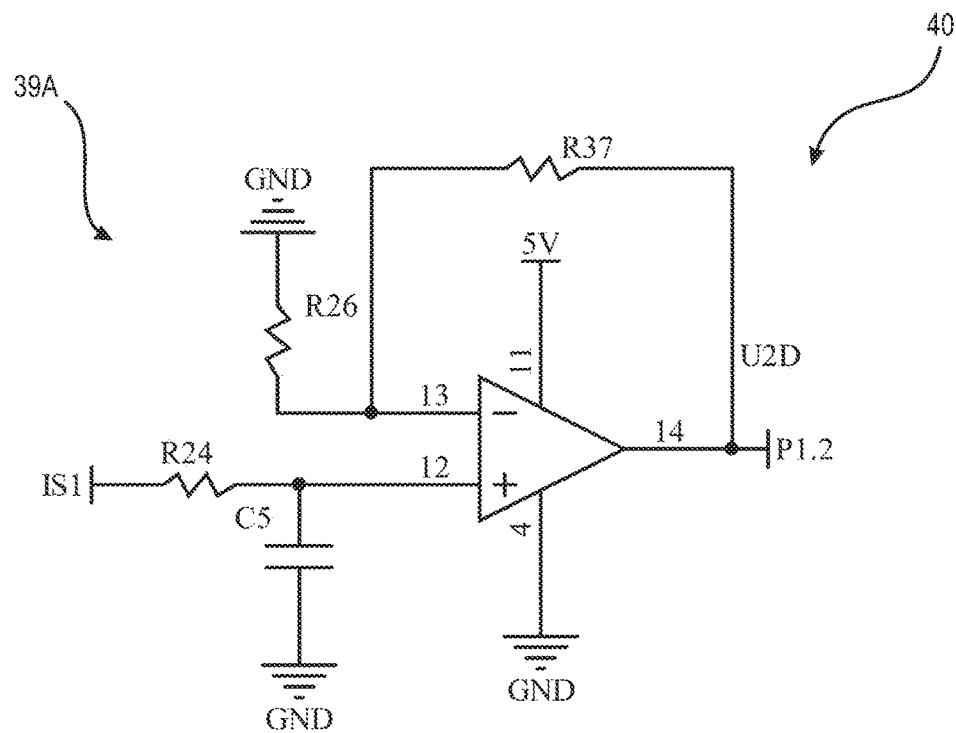
FIG. 4D(1)
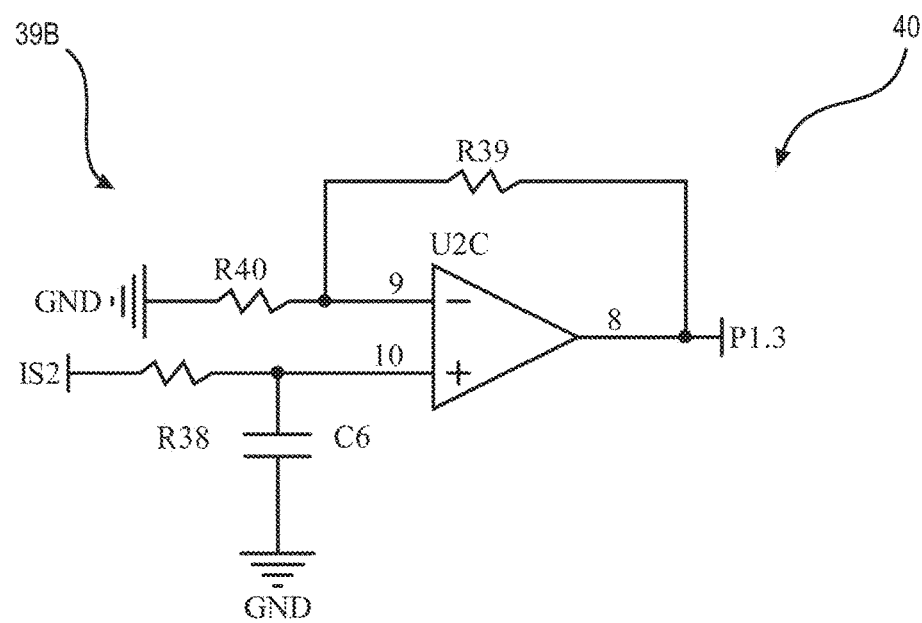
FIG. 4D(2)

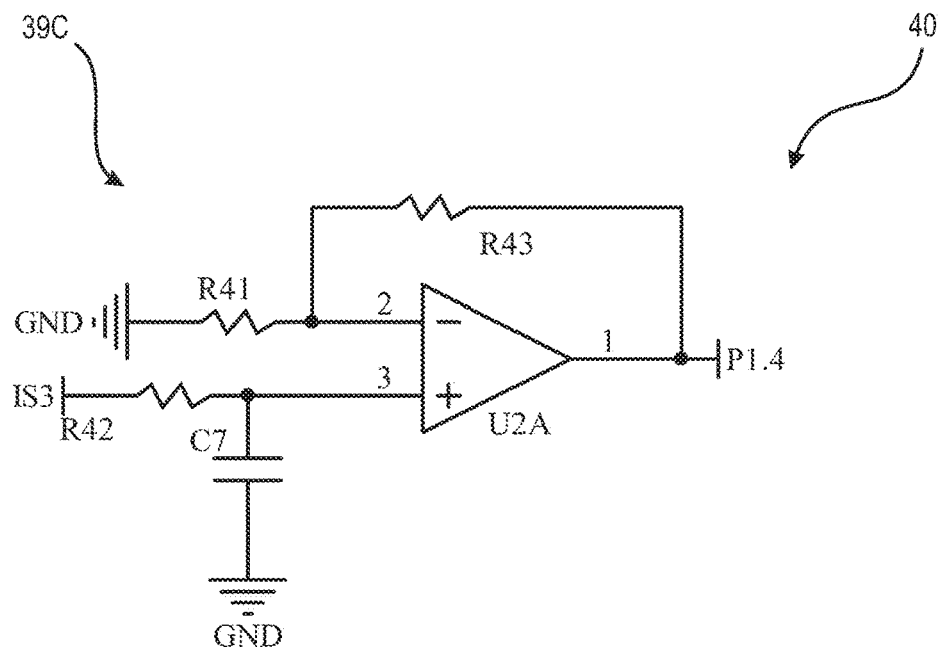
FIG. 4E(1)
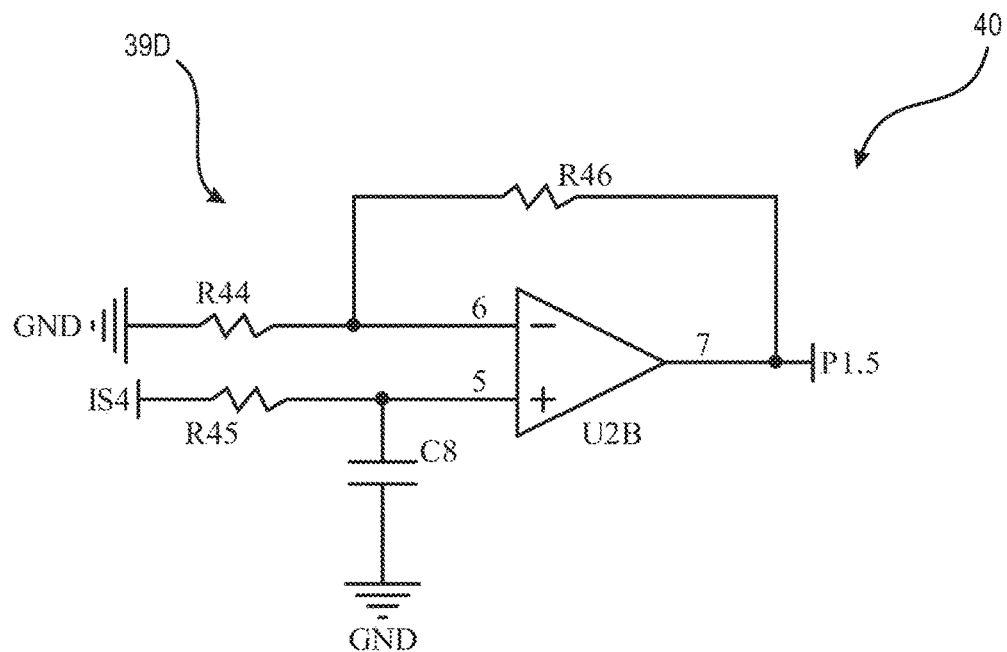
FIG. 4E(2)

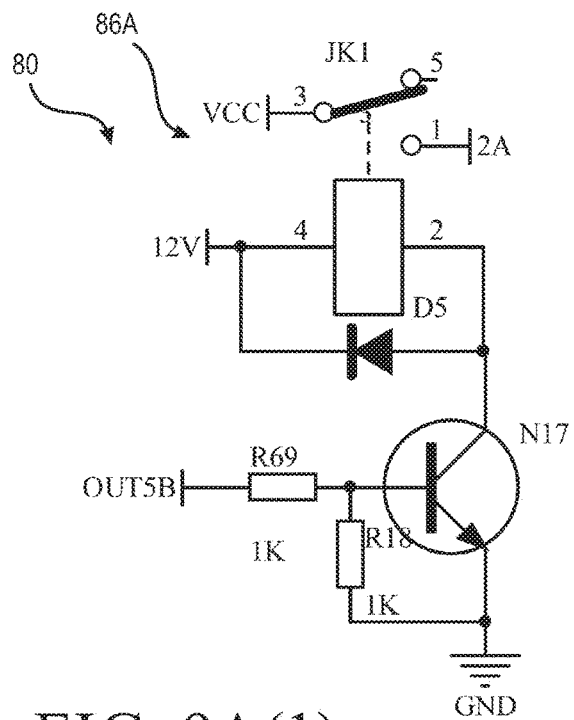
FIG. 9A(1)
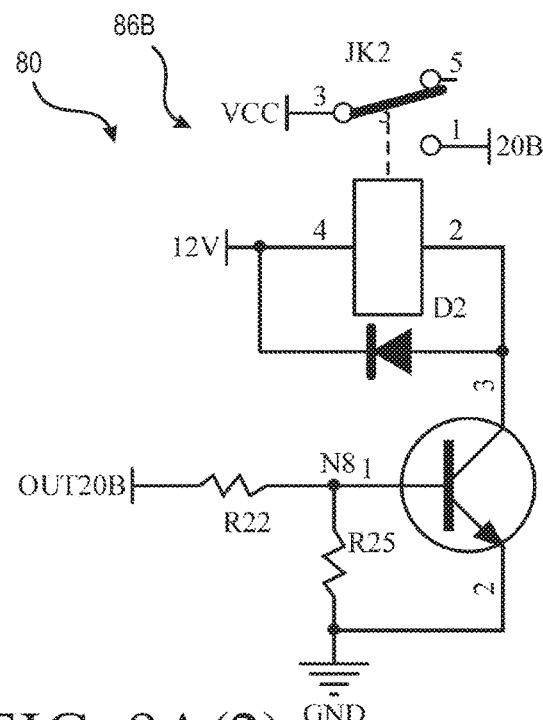
FIG. 9A(2)
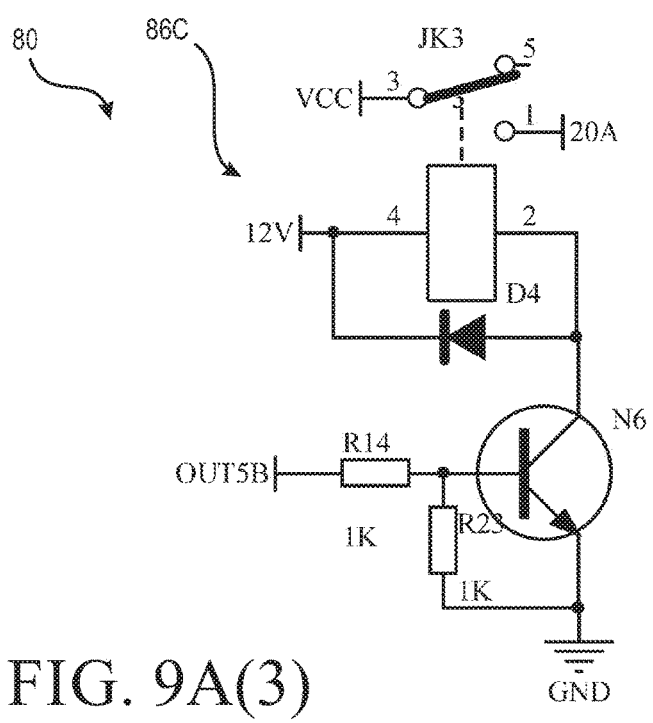
FIG. 9A(3)

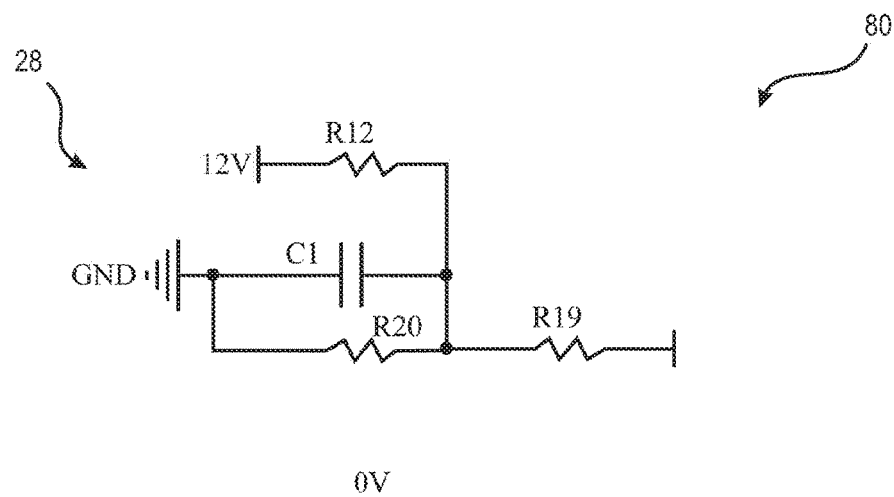
FIG. 9C(1)
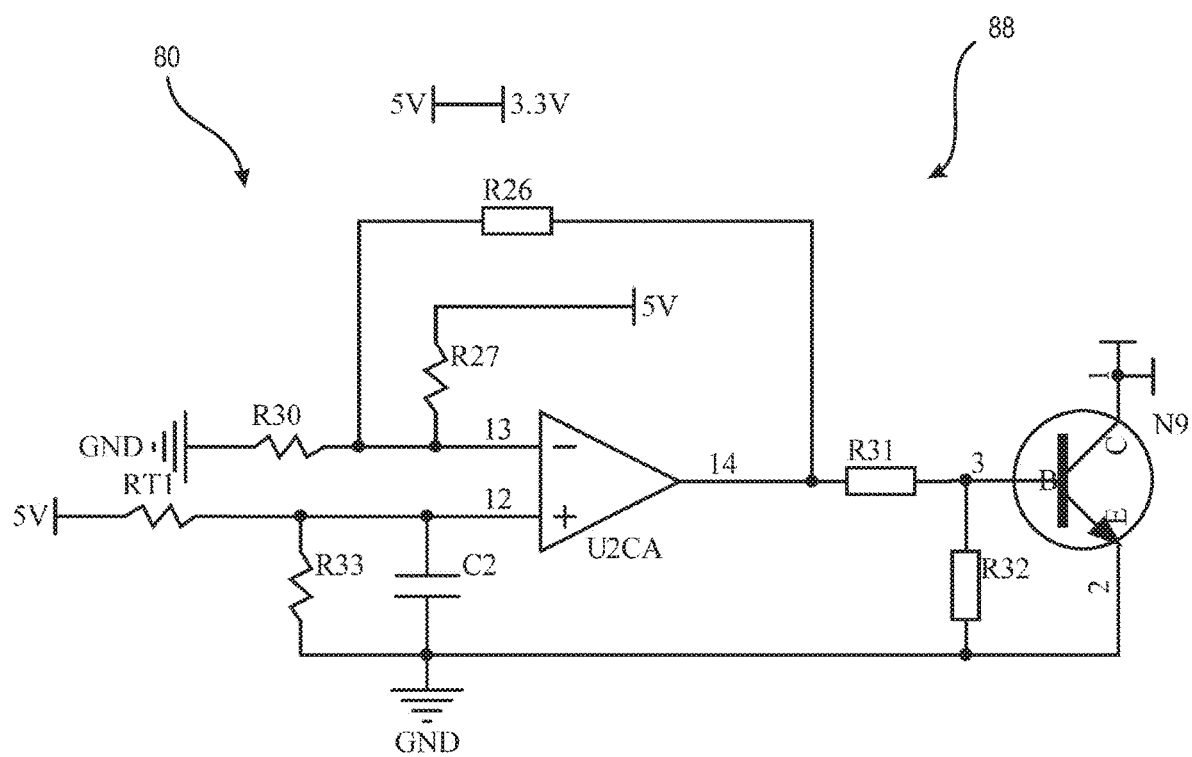
FIG. 9C(2)

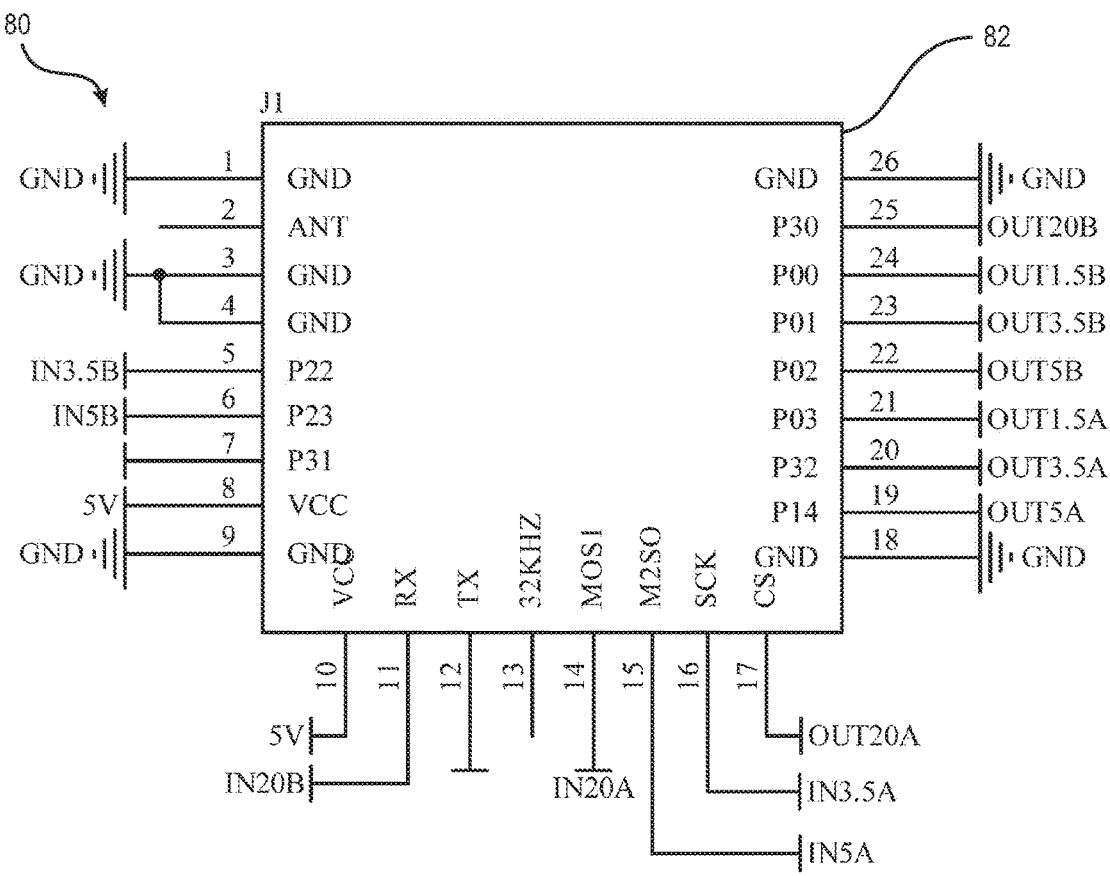
FIG. 9D(1)
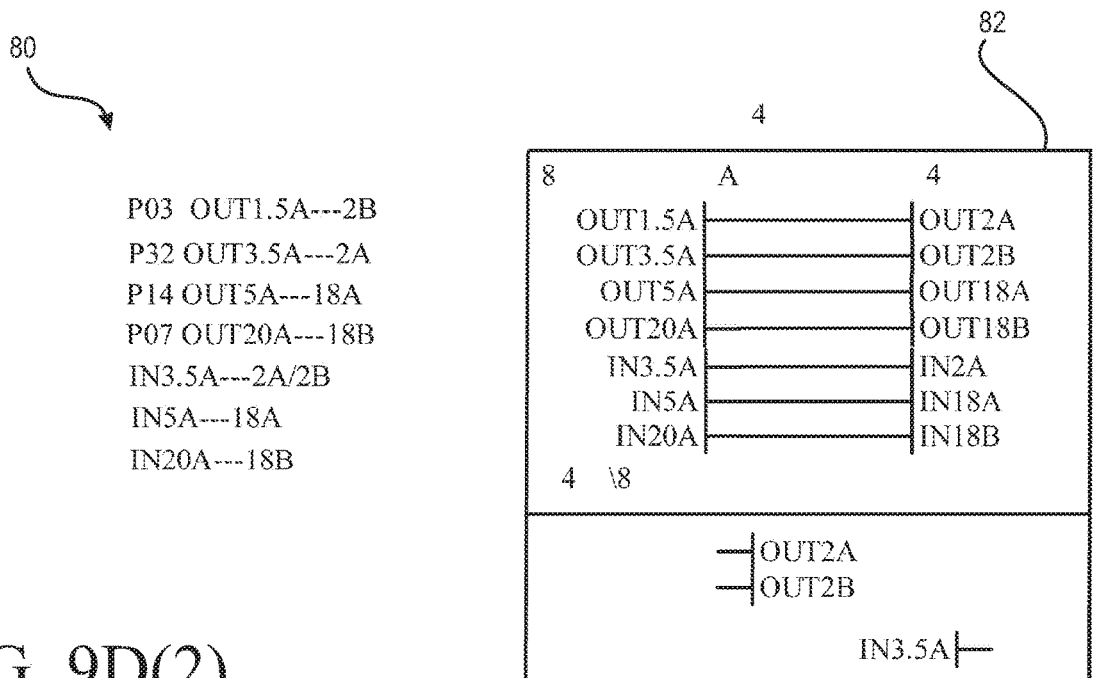
FIG. 9D(2)

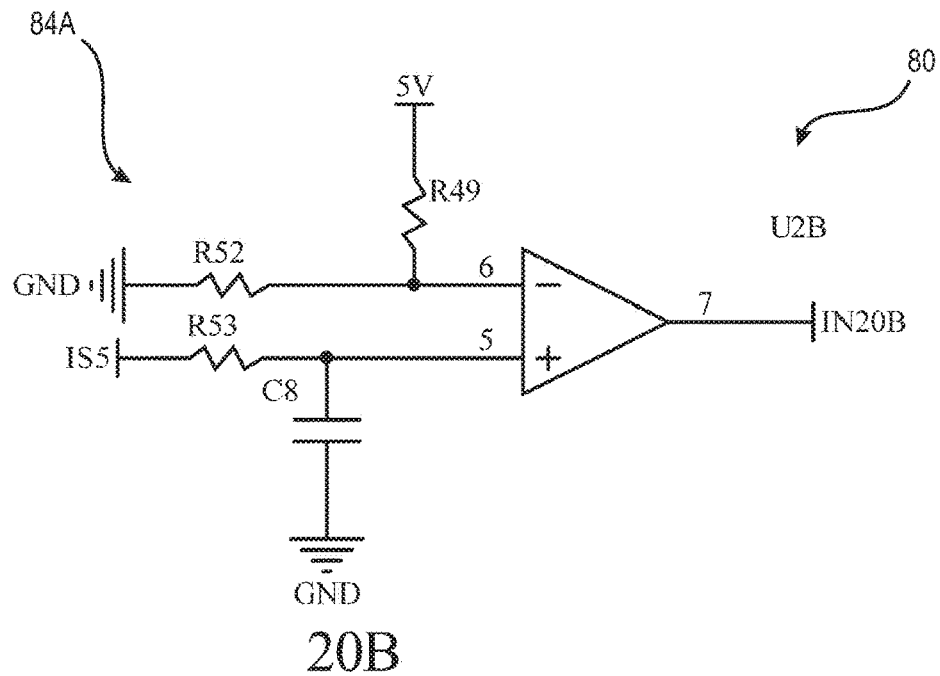
FIG. 9F(1)
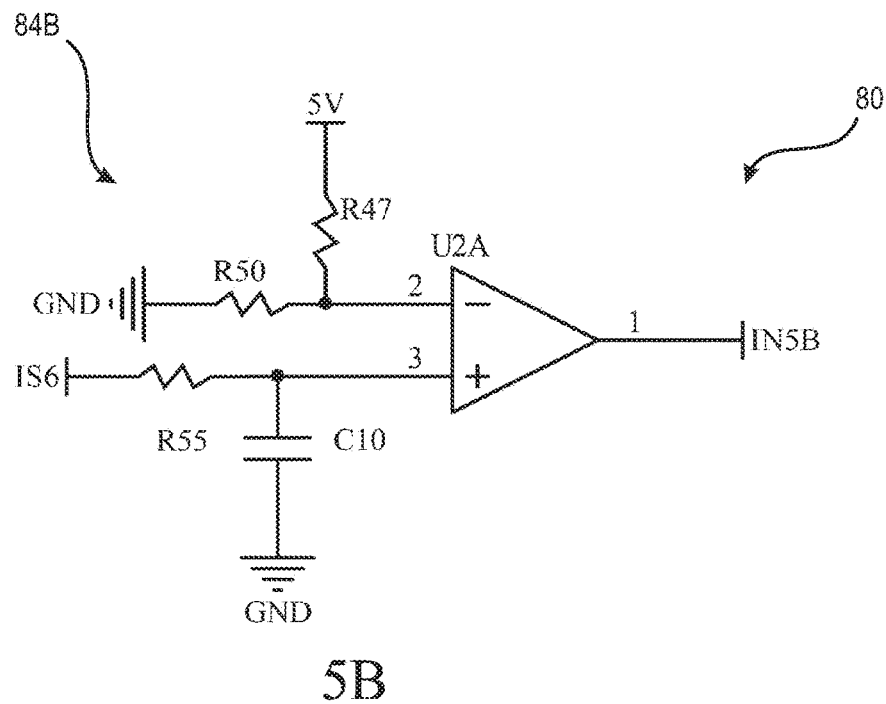
FIG. 9F(2)

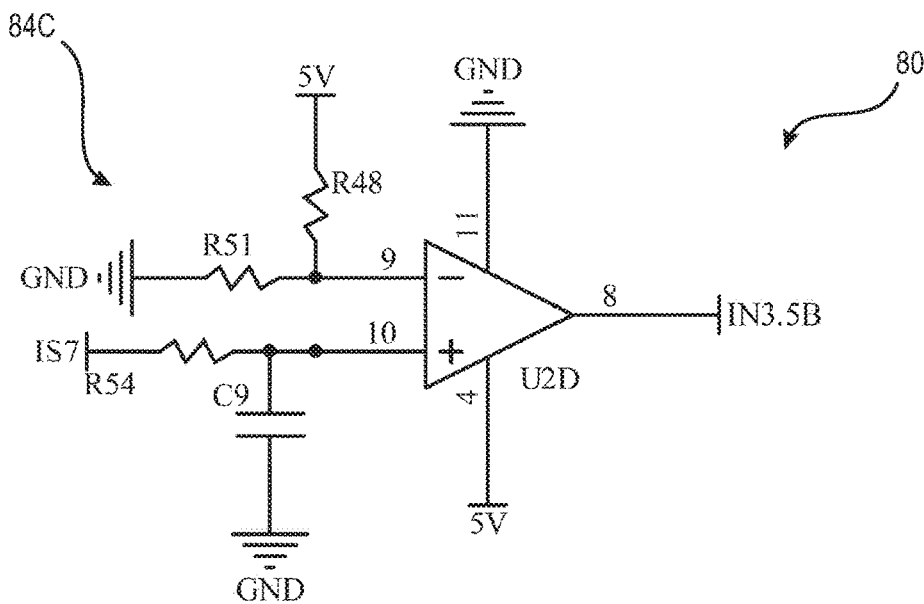
3.5B/1.5B
FIG. 9G(1)
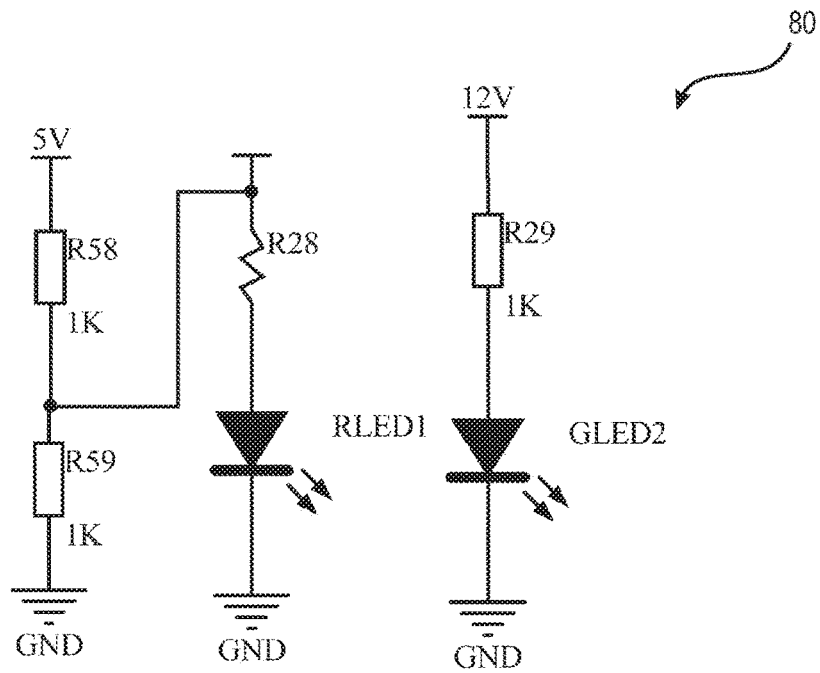
FIG. 9G(2)

AUXILIARY VEHICLE LIGHTING CONTROL SYSTEM

RELATED APPLICATIONS

This application is a continuation application, and claims priority benefit with regard to all common subject matter, of earlier-filed U.S. Non-Provisional patent application Ser. No. 15/794,898, titled "AUXILIARY VEHICLE LIGHTING CONTROL SYSTEM", filed Oct. 26, 2017. Application Ser. No. 15/794,898 claims priority benefit with regard to all common subject matter of earlier-filed U.S. Provisional Patent Application Ser. No. 62/413,799, titled "REMOTE VEHICLE LIGHTING CONTROL SYSTEM", filed Oct. 27, 2016. The earlier-filed applications are hereby incorporated by reference in their entireties into the present application.

BACKGROUND

The present invention relates generally to vehicle lighting systems and, more specifically, to auxiliary vehicle lighting systems equipped with remote vehicle lighting control.

Vehicle enthusiasts, particularly in the off-road vehicle market, are a group of consumers that are especially akin to after-market vehicle customization. There are a number of customizations available in the vehicle industry, one subset of which includes auxiliary vehicle lighting systems (i.e. installing auxiliary vehicle lights in addition to, or as substitution for, stock vehicle lighting systems that are put in place by the vehicle manufacturer). As customization options for auxiliary vehicle lights are plentiful, and auxiliary lights can be mounted virtually anywhere on the vehicle, it is important for a vehicle owner or customizer to have an adequate system for controlling the auxiliary lights.

Conventional control systems include after-market solutions that have little interaction with the vehicle itself, short of drawing power from the vehicle's electrical system. As these conventional systems do not rely on vehicle electrical system feedback, there is the potential for electrical system drain. Such an electrical drain not only affects the auxiliary vehicle lighting system, but other systems within the vehicle that rely on the vehicle's electrical system—most notably the engine startup systems.

An additional drawback of conventional auxiliary vehicle lighting control systems is the lack of feedback to the user as to the status of the auxiliary lighting system—particularly in the event that no auxiliary lights (i.e. user indicators) are connected to the system or a portion of the system. This lack of feedback creates a likelihood of accidental energization of the system for long periods of time, thus leading to electrical system power drain.

Thus, there is a need for an improved auxiliary vehicle lighting control system that addresses the above-listed drawbacks of conventional systems.

SUMMARY

The above-listed needs are met or exceeded by the present auxiliary vehicle lighting control system which features a battery voltage monitor and shut down function or program, constructed and arranged so that the system is shut down before the battery drops below a certain low voltage level. Additionally, in the event that the system is inadvertently triggered without connection to auxiliary lights (i.e. without user indication), a feature is provided to turn off the system after a specified period of time, to avoid a power drain the controller may pose to the vehicle electrical system. The present system features a separate remote control unit that is used to control the respective lights, and is also optionally usable on a smartphone with a dedicated smartphone application.

More specifically, an auxiliary vehicle lighting control system is provided for use in a vehicle having an engine and an electrical system, and at least one auxiliary vehicle light. The system has a control hub, connected to the vehicle electrical system and to each auxiliary vehicle light; and a system shut down function or program, connected to the control hub and configured to de-energize the auxiliary lighting system. The control hub is constructed and arranged so that upon illumination of the auxiliary vehicle lights and with the engine turned off, the vehicle battery voltage is monitored. If the battery voltage reaches a designated low voltage target, the system shut down function or program is activated, which de-energizes the at least one auxiliary light.

Optionally, the vehicle lighting control system includes a remote control unit with a series of controls corresponding to at least one of the energization, de-energization, and dimming of the auxiliary lights and a transmitter or transceiver for wireless communication with the control hub. Importantly, a timer is provided for monitoring a duration of time between the present moment and the moment when the most recent wireless transmission was received from the remote by the control hub. To reduce power drain to the system, the timer triggers the system shut down function or program if the duration between the present moment and the moment of the most recent wireless transmission reaches a specified timeout duration.

BRIEF DESCRIPTION OF THE DRAWINGS

FIGS. 3A, 3B, 3C(1), 3C(2), 3C(3), 3C(4), 3D(1), 3D(2), 3D(3), 3D(4), 3E(1), 3E(2), 3F(1), 3F(2), 3G(1), and 3G(2) are schematics of one embodiment of the present control hub;

DETAILED DESCRIPTION

Figure 1:
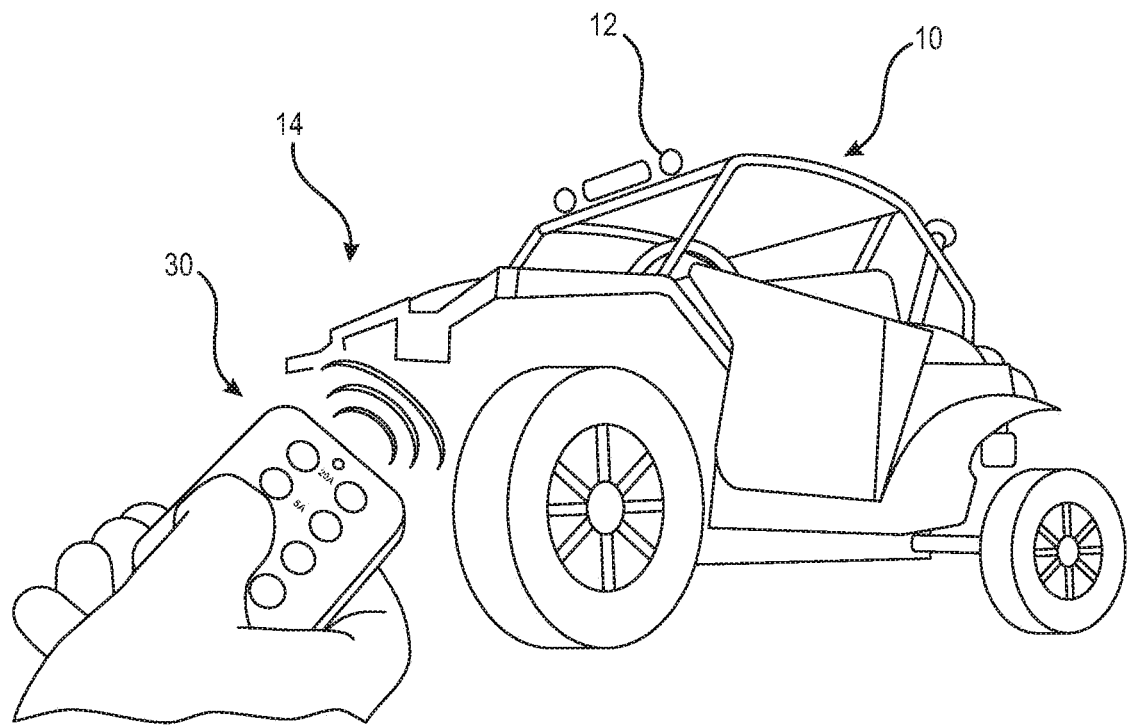
FIG. 1 is a side perspective view of the vehicle with auxiliary vehicle lighting system and a remote control unit.
Figure 2:
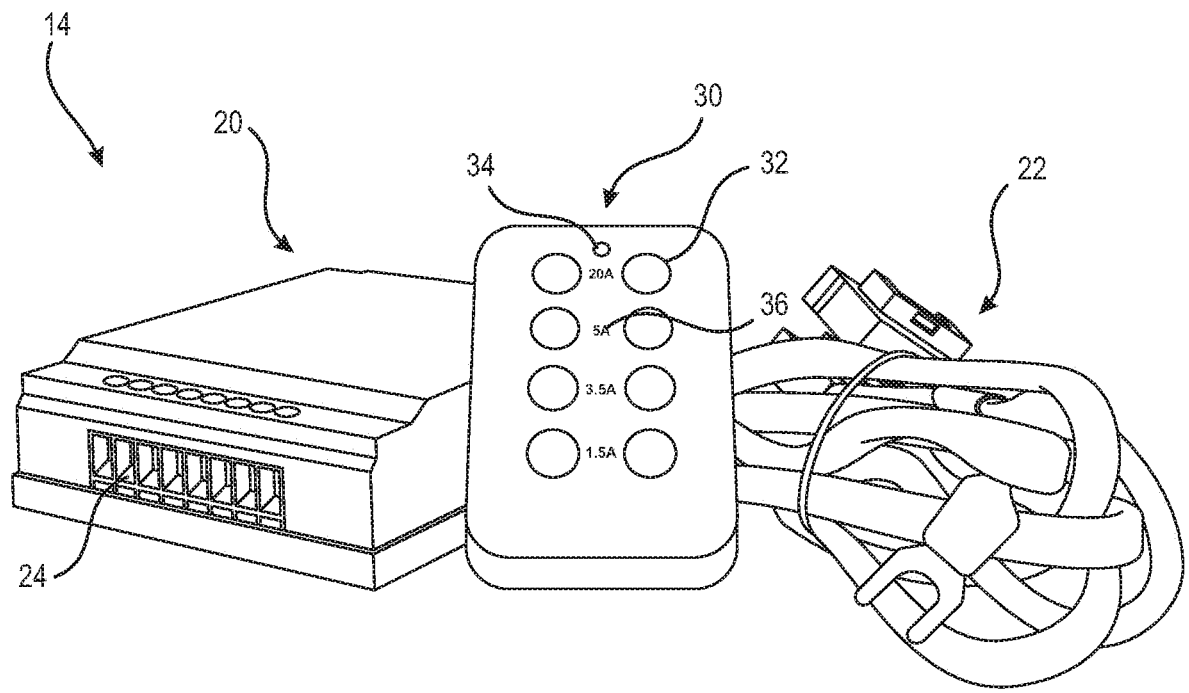
FIG. 2 is a front perspective view of the control hub, remote control unit, and control hub wiring.

Referring to FIGS. 1 and 2, the vehicle is generally designated 10 and includes an engine housed in an engine compartment and an auxiliary vehicle lighting system designed for use with auxiliary vehicle lights 12. As is known in the art, the auxiliary lights 12 include at least one such light, and preferably a plurality of such lights. Power for the present auxiliary vehicle lighting control system, generally designated 14, is provided by the vehicle electrical system which, in a typical embodiment, is supplied by one or more 12 VDC, rechargeable sealed lead-acid batteries (though other power sources are anticipated). In a preferred embodiment, control of the auxiliary vehicle lighting system 14 is provided by a control hub 20 (FIG. 2).

The control hub 20 is designed to accommodate mounting on the vehicle 10, specifically within the engine compartment of the vehicle 10, adjacent to and/or in close proximity to a firewall. Placement proximate to the firewall results in relatively few firewall openings needed to route wiring to the auxiliary vehicle lights 12. In the preferred embodiment, the control hub 20 is electrically connected to the auxiliary vehicle lights 12, and to the vehicle electrical system via a wiring harness 22, as shown generally in FIG. 2. To facilitate connection to the auxiliary vehicle lights 12, the control hub 20 includes at least one set of terminal blocks 24, accessible to the installer. Optionally, up to eight auxiliary vehicle lights 12 are electrically wired to the control hub 20. As discussed above, the number of auxiliary lights 12 may vary to suit the application.

In another embodiment, the control hub 20 optionally includes at least two of the terminal blocks 24 for connection to the vehicle lights 12 and a number of fuses equal to the number of terminal blocks. In this embodiment, each fuse corresponds to exactly one terminal block 24 and protects the vehicle lights 12 connected to that terminal block. Typically, the configuration includes two terminal blocks 24 and two fuses, however, additional configurations with more terminal blocks and fuses are anticipated. Multiple fuses provide more user flexibility in wiring auxiliary vehicle lights 12 and allow for a greater power draw from the control hub 20 when compared to single fuse configurations.

Functionally, the control hub 20 is designed to control the energization, de-energization, and/or dimming of each of the auxiliary vehicle lights 12. The control hub 20 also includes a system shut down function or program 25, configured to de-energize the auxiliary lightings 12. The shut down function or program 25 is preferably a software routine, program or component, programmed into and controlled by a processor/microcontroller 26 (FIG. 3B) of the control hub 20, or a hardware circuit, such as a transistor, relay, mechanical switch, or the like. In a preferred embodiment, the control hub 20, upon illumination of at least one auxiliary vehicle light 12, with the engine turned off, monitors the vehicle battery voltage via a battery monitor circuit 28 (FIG. 3B). If the battery voltage dips below a designated low voltage target, the system shut down function or program 25 is activated to de-energize the auxiliary lights 12. The low voltage target is typically set to 9.8 VDC±0.3 VDC, at which point the vehicle battery still has enough power to start the engine (after which the vehicle's alternator will re-charge the battery to its nominal voltage).

As an alert to the user and to maintain the battery in a state that is sufficiently charged to start the vehicle 10, the control hub 20 is constructed and arranged so that upon the auxiliary lights 12 being deenergized, as described above, the vehicle engine must be turned on for the lights 12 to be re-energized. As an additional safeguard against battery drain, re-starting the vehicle's engine alone will not re-energize the auxiliary vehicle lights 12; the auxiliary lights are re-energized only upon user activation (i.e. the user must both restart the vehicle 10 and actively re-energize the lights).

As shown generally in FIG. 2, in a preferred embodiment of the vehicle lighting control system 14, a remote control unit 30 is provided. Thus, the system 14 includes the control hub 20, the remote control unit 30, and optional related connecting cables. The remote control unit 30 is typically powered by a battery 31 (FIG. 5) and provided with a series of controls corresponding to at least one of the energization, de-energization, and dimming, of at least one of the auxiliary lights 12. The controls optionally include buttons 32, indicators 34, and/or control labels 36 corresponding to control of the auxiliary lights 12. To communicate with the control hub 20, the control system 14 additionally includes any combination of a transmitter/receiver or transceivers for wireless communication. Accidental depression of a button 32 being common, especially when the remote control unit 30 is placed in a user's pocket, a timer in the processor is provided for monitoring the duration of time between the present moment and the moment when the most recent wireless transmission was received from the remote control unit 30 at the control hub 20.

Figure 3A:
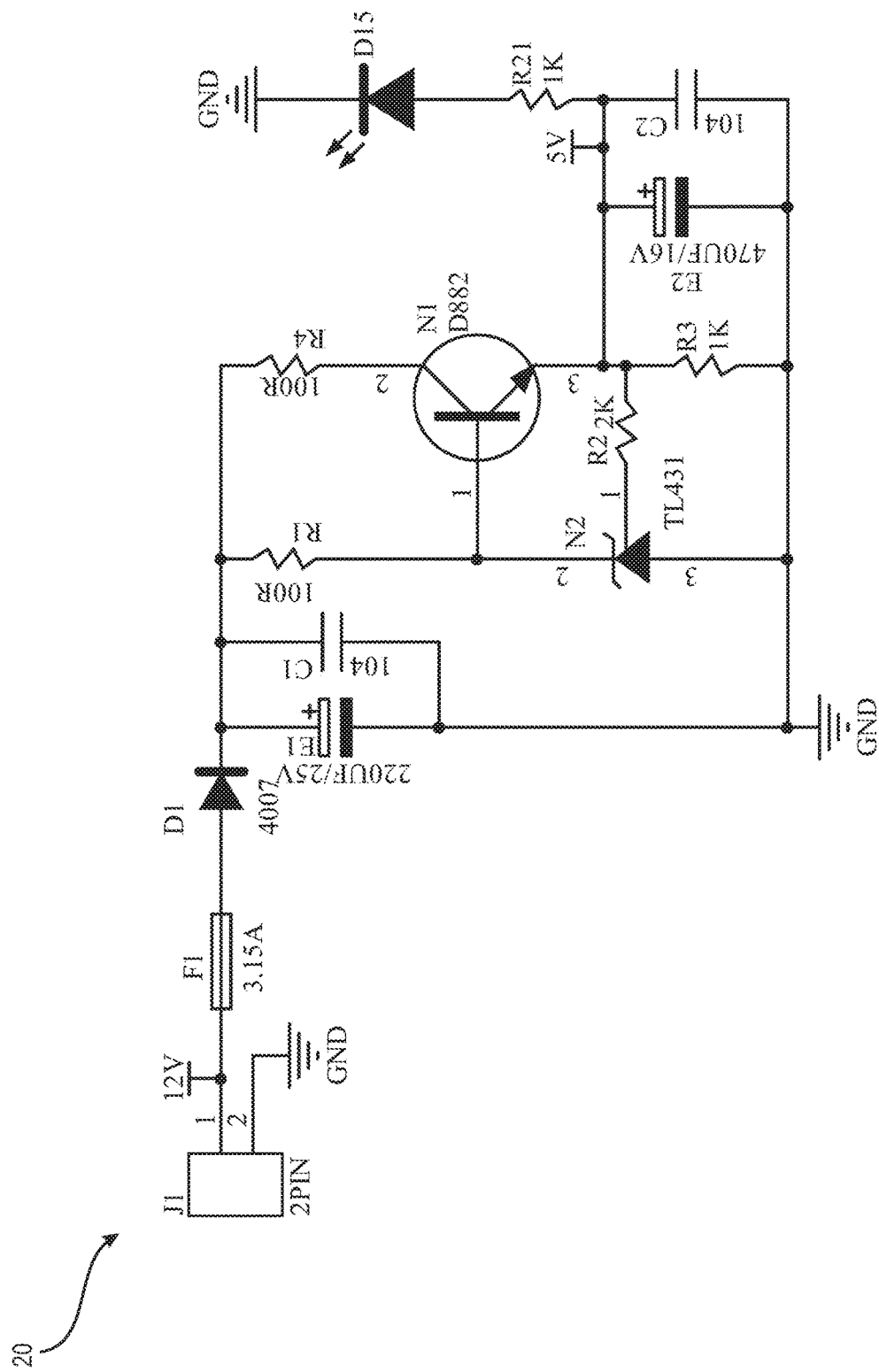
Figure 3B:
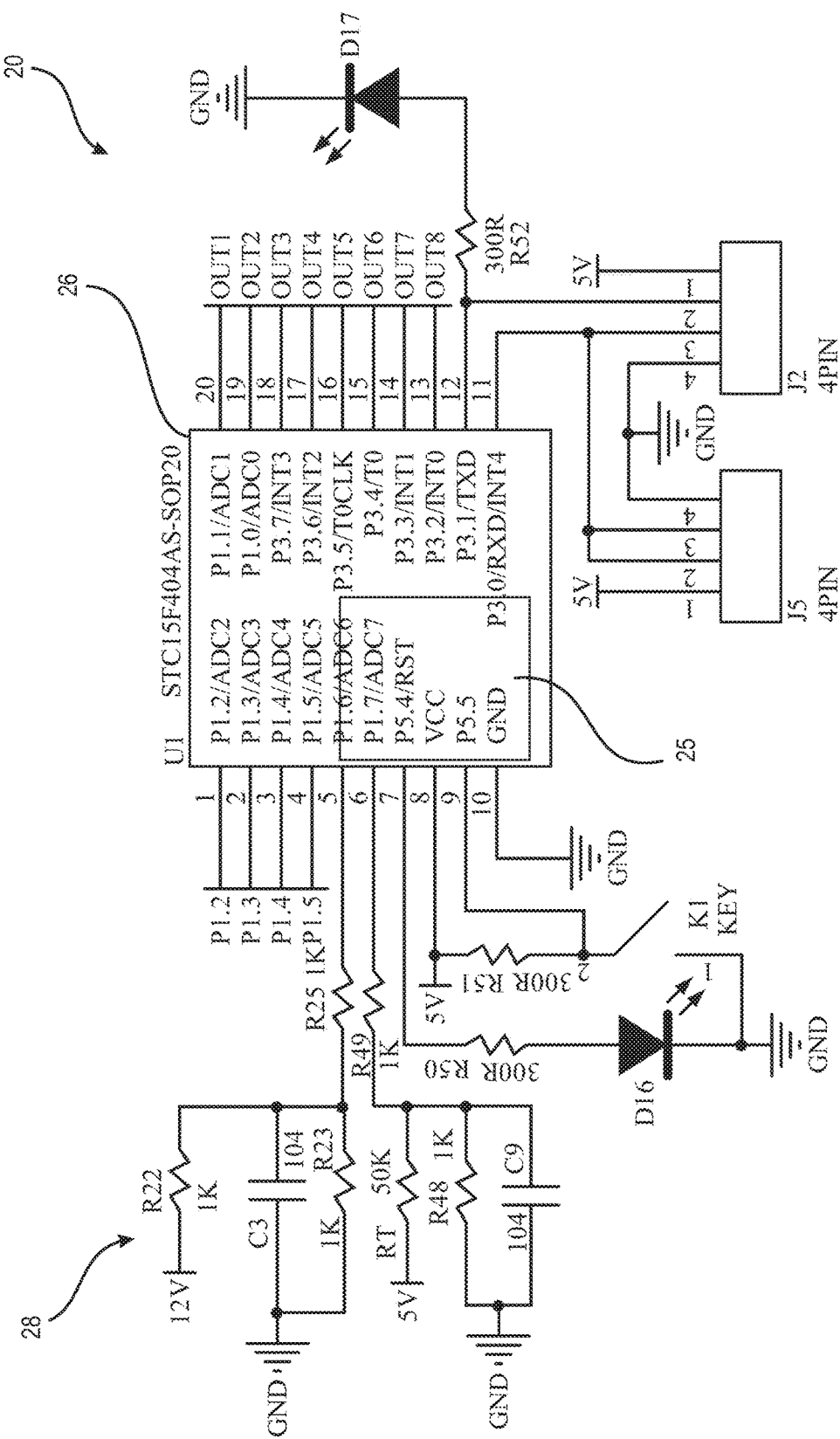

Referring now to FIGS. 3C(1), 3C(2), 3C(3), 3C(4), 3D(1), 3D(2), 3D(3), 3D(4), 3E(1), 3E(2), 3F(1), and 3F(2), each auxiliary light circuit 38A-38H is monitored for current draw via an auxiliary light monitor circuit 39A-D. To reduce power drain due to inadvertent energization of a specific auxiliary light circuit 38A-3811 not connected to an auxiliary vehicle light 12, the timer triggers the system shut down function or program 25 if the duration between the present moment and the moment of the most recent wireless transmission reaches a specified timeout duration. The timeout period is generally equal to forty-eight hours, a duration which is short enough to reduce power drain to the battery in the event of an inadvertent auxiliary light circuit 38 energization. However, other timeout periods are contemplated, depending on the application. This feature is particularly beneficial if the vehicle is stored for long periods of time between use, as it reduces the worry that an accidental button depression may draw power from the battery for an extended period.

Figure 4A:
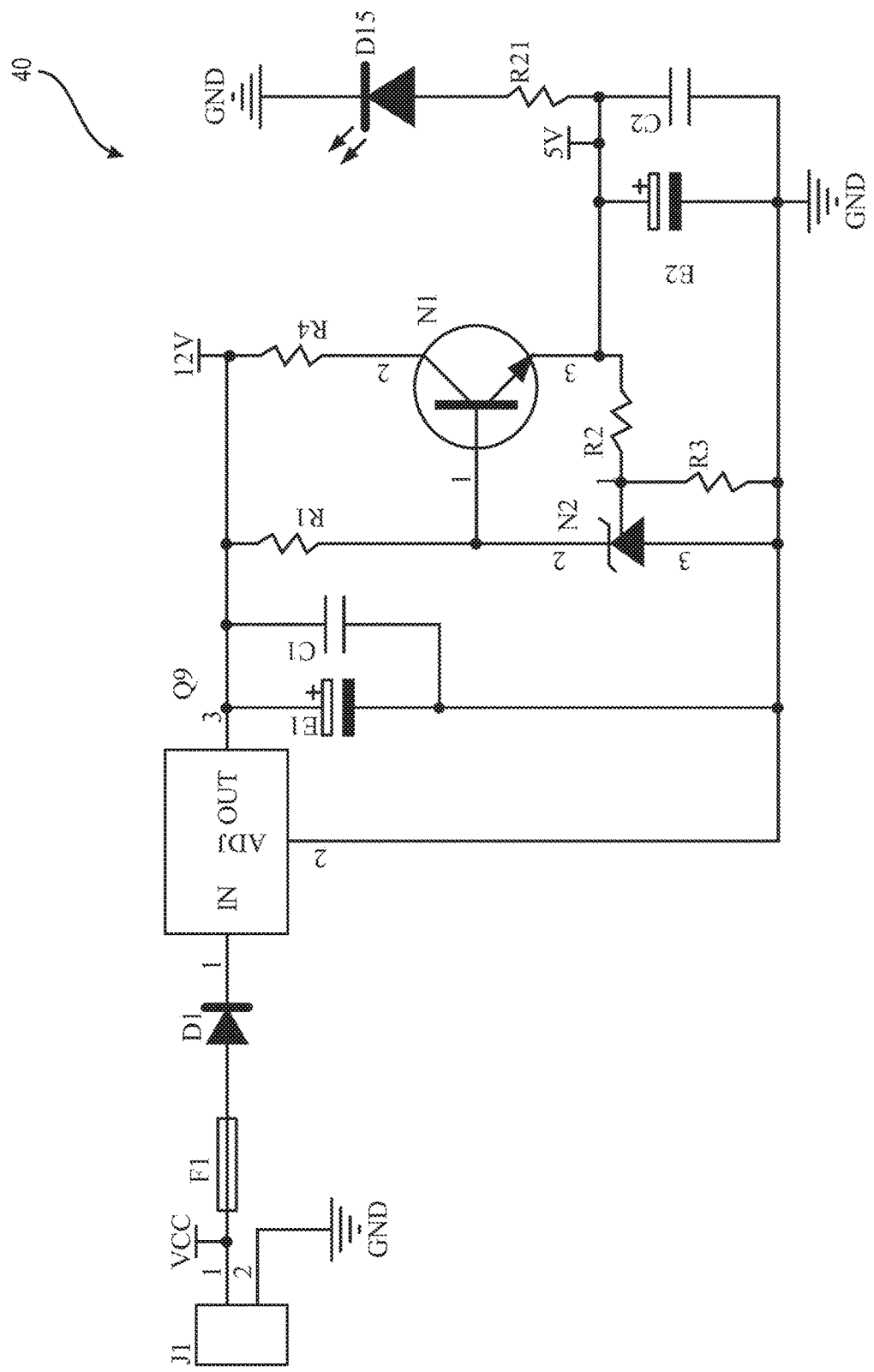
FIGS. 4A, 4B, 4C(1), 4C(2), 4C(3), 4C(4), 4D(1), 4D(2), 4E(1), 4E(2), and 4F are schematic views of an alternate embodiment of the present control hub.
Figure 4B:
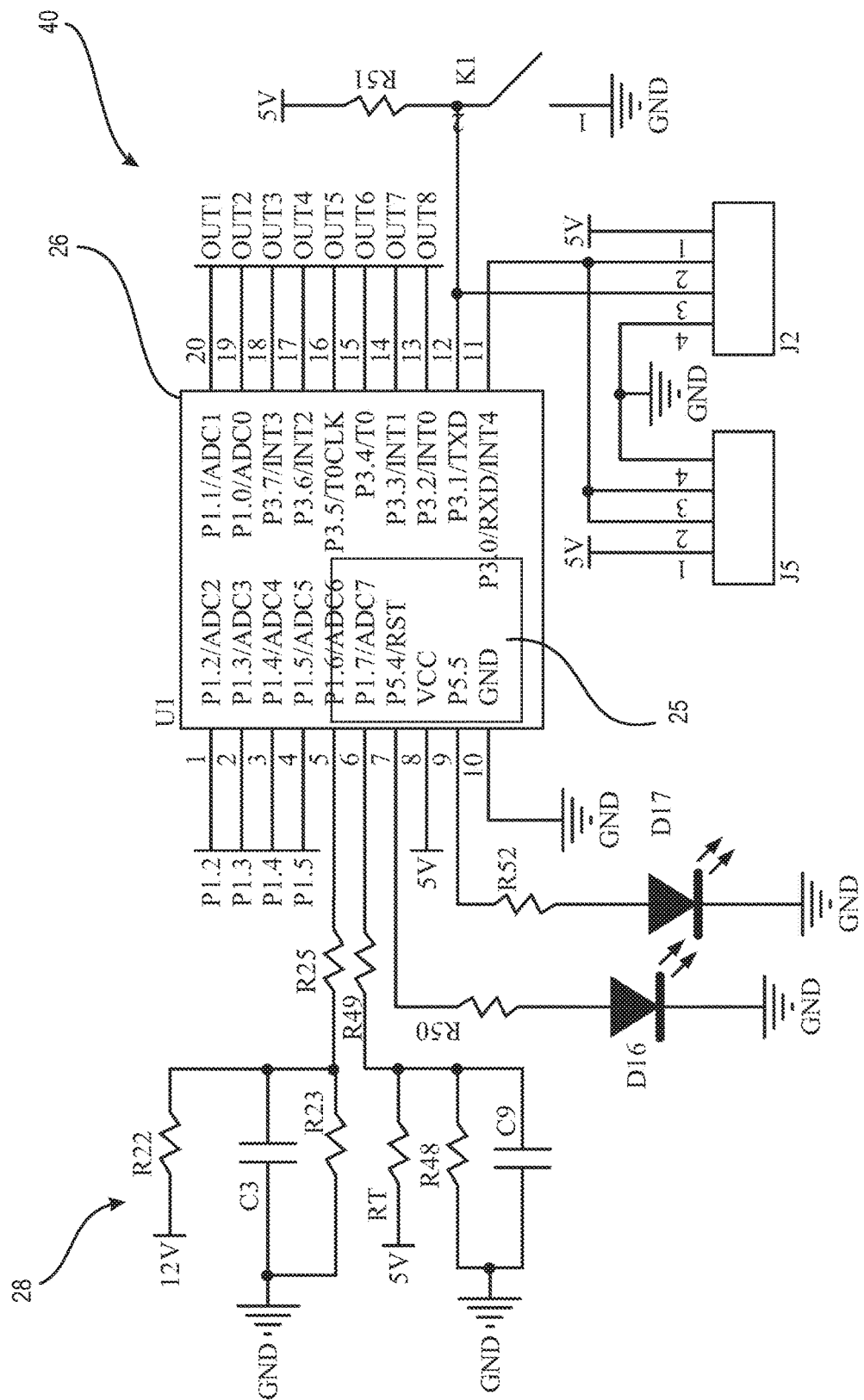
Figure 4F:
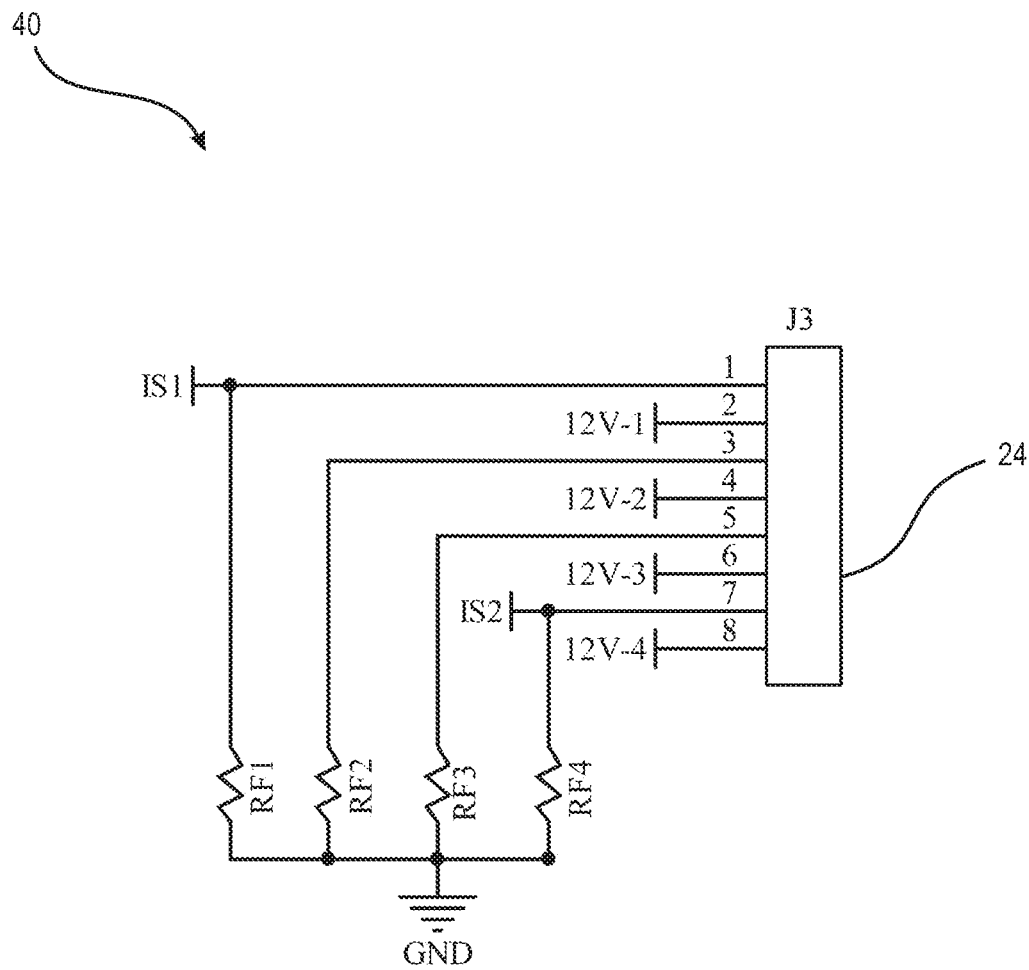

FIGS. 3C(1), 3C(2), 3C(3), 3C(4), 3D(1), 3D(2), 3D(3), and 3D(4) generally show a control unit with eight auxiliary light circuits 38A-38H. Depending on user needs, additional or fewer auxiliary light circuits 38A-38H may be needed. FIGS. 4A, 4B, 4C(1), 4C(2), 4C(3), 4C(4), 4D(1), 4D(2), 4E(1), 4E(2), and 4F show an exemplary alternate embodiment of control hub 40 in which four auxiliary lighting circuits 42A-42D are provided. Elements of the control hub 20 that are shared with control hub 40 are identified with identical reference numbers.

Figure 5:
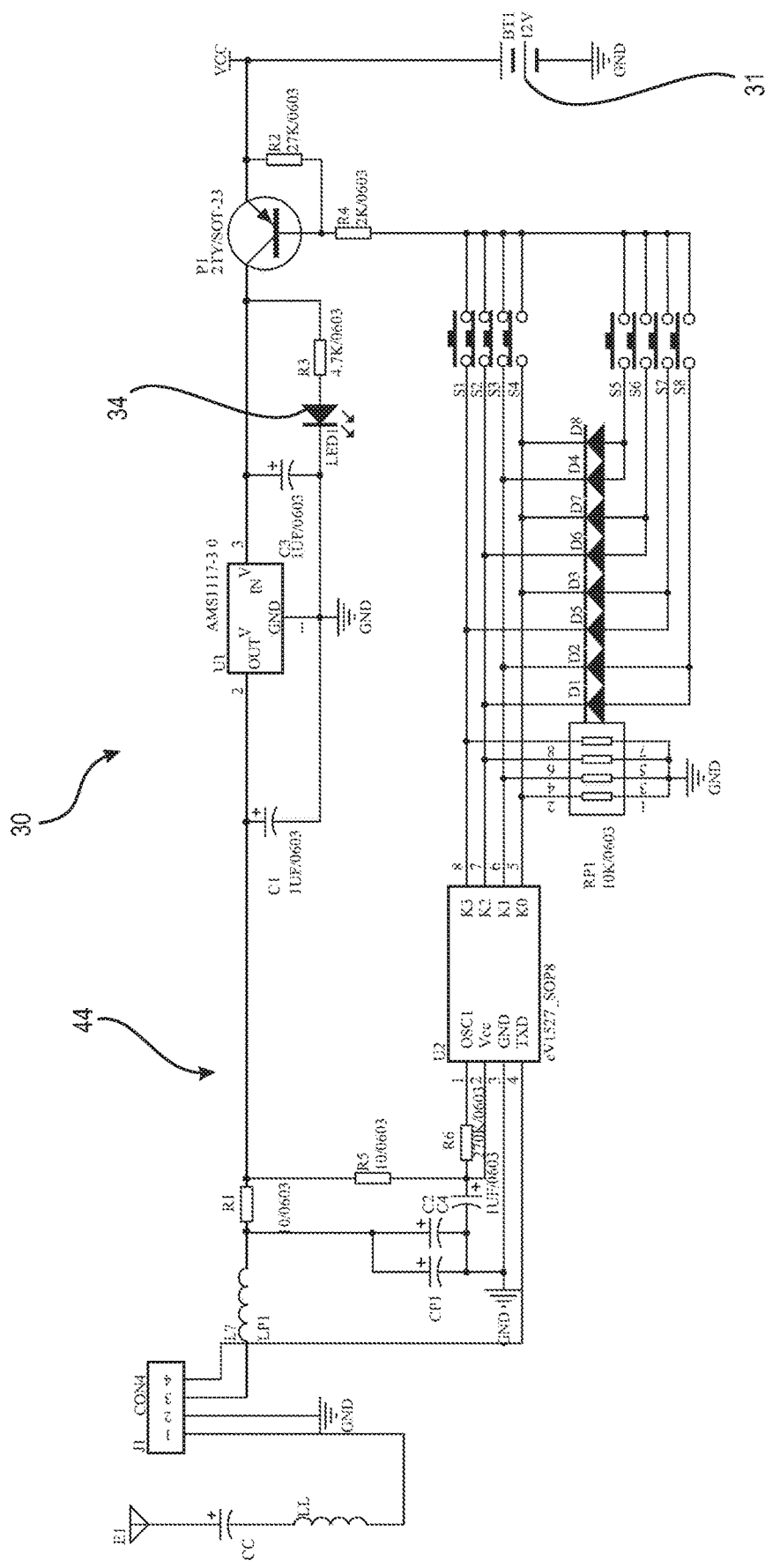
FIG. 5 is a schematic of the remote control unit of the present system.

Referring now to FIG. 5, a schematic representation of one embodiment of the remote control unit 30 is shown. In this embodiment, the remote control unit 30 is powered by a battery 31. As is well known in the art, the battery 31 may be replaceable or rechargeable. Energization, de-energization, and/or dimming of the various auxiliary vehicle lights 12 is controlled via use of the pushbuttons 32. The control signals are sent to the control hub 20 via the remote transmitter/receiver/transceiver circuit 44. Signaling is provided to the user via the indicator 34.

Figure 6:
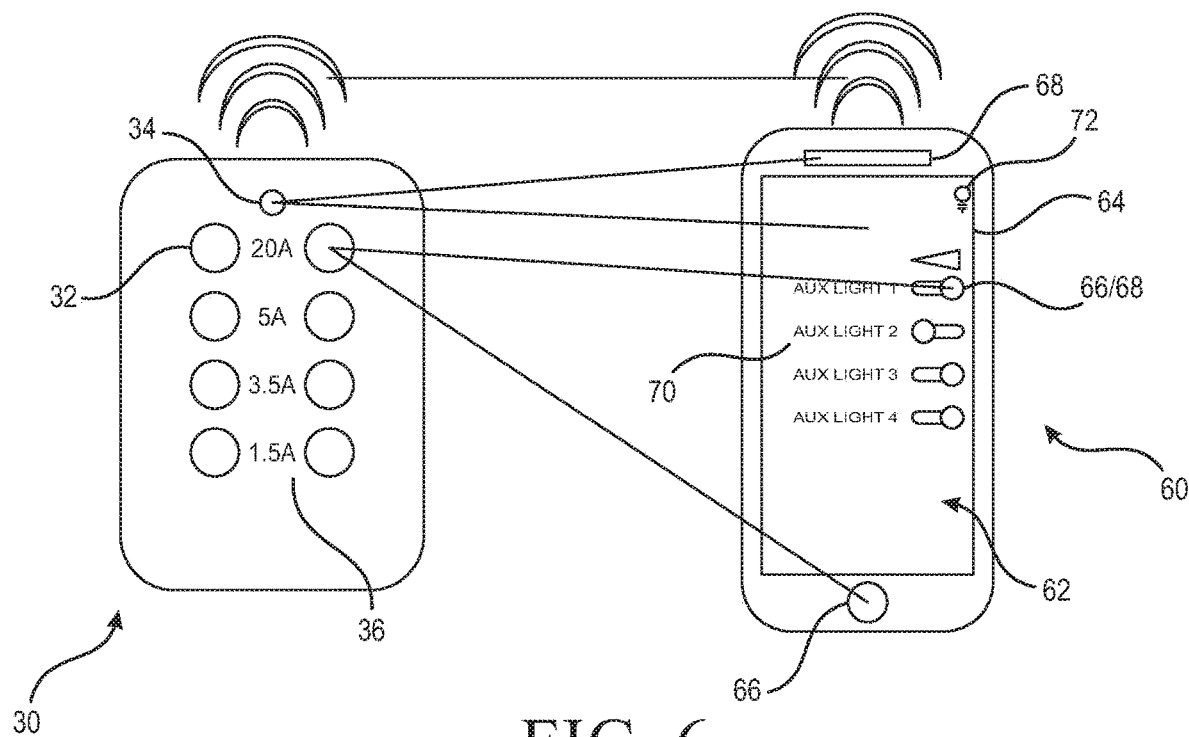
FIG. 6 is a diagram view illustrating corresponding elements of the standard remote control and smartphone remote control embodiments.

Referring now to FIG. 6, in an alternate embodiment, the remote control unit 30 is implemented via a software application or "app" stored in nonvolatile memory and executed via a microprocessor on a smartphone 60 (smartphone app). The smartphone app includes a graphical user interface 62 displayed via the smartphone display screen 64 and/or other smartphone audio and visual outputs and accepts user inputs via smartphone input interfaces such as touchscreens 64, volume rockers, other external buttons, and the like as are well known in the art. The smartphone app implements, in software, all of the features of the remote control unit 30 indicated previously, including a series of controls corresponding to at least one of the energization, de-energization, and dimming 66, of at least one of the auxiliary lights 12; indicators 68; and labels 70.

Additionally, the smartphone app is particularly advantageous as it provides for the programming of custom warnings, alerts, sounds, vibrations, audible or visual cues, and other notifications 72 upon the occurrence of certain events. For example, an alert may be programmed to notify the smartphone user when one or more of the auxiliary light circuits 38 are inadvertently left in an energized state. Additionally, an alert may be programmed to notify the smartphone user when the vehicle electrical system falls below a predefined low voltage target (e.g., an alert may be set to notify the user before or when the battery voltage falls to 9.8 VDC±0.3 VDC). The smartphone app also allows for customized programming of the timeout period between inadvertent energization of a specific auxiliary light circuit 38A-H and activation of the system shut down function or program 25. Programming involves the user setting the timeout duration to a desired value via the software app, after which the desired value is transmitted to the control hub 20, and the control hub sets the timeout duration to the desired value.

Figure 7:
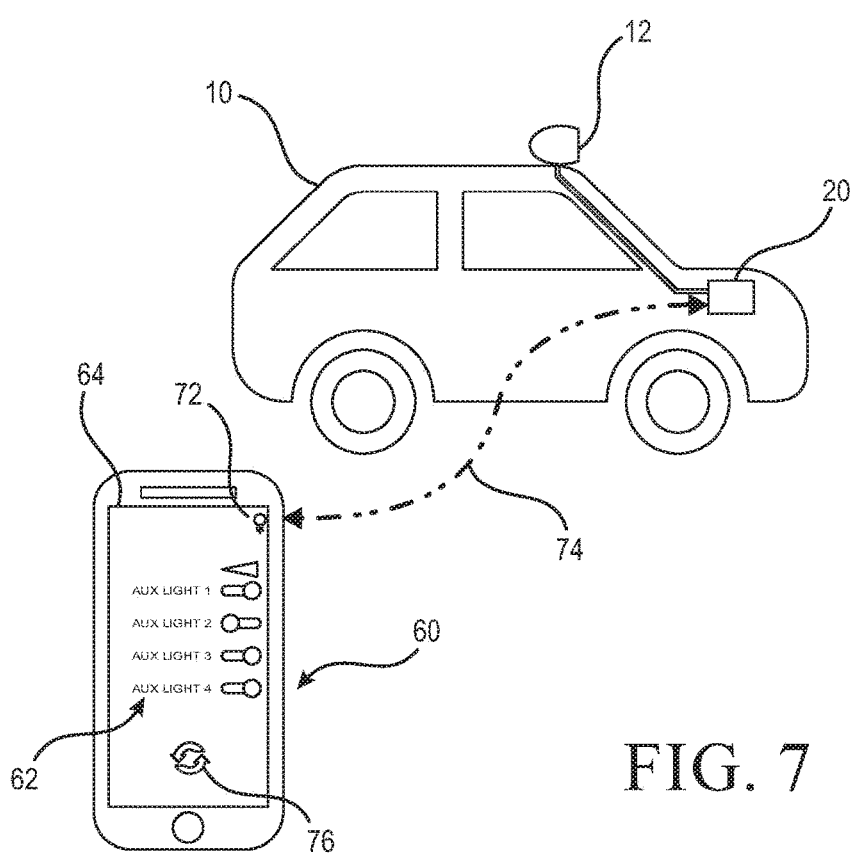
FIG. 7 is a diagram view of another embodiment of the present light control system, showing communication between the smartphone and the control hub.

Referring to FIG. 7, in the smartphone embodiment described above, communication between the smartphone 60 and the control hub 20 is accomplished via wireless transmission 74, preferably utilizing the existing wireless radios present in the smartphone (e.g., Bluetooth, GSM/UMTS/CDMA/LTE, IEEE 802.11 WiFi, NFC, or the like). This smartphone radio feature is particularly advantageous in that no additional hardware is required for communication between the smartphone and the control hub 20. Furthermore, the smartphone app is particularly advantageous in that it provides a visual and/or audible indicator 76 signifying proper wireless communication and/or wireless connection with the control hub 20.

Figure 8:
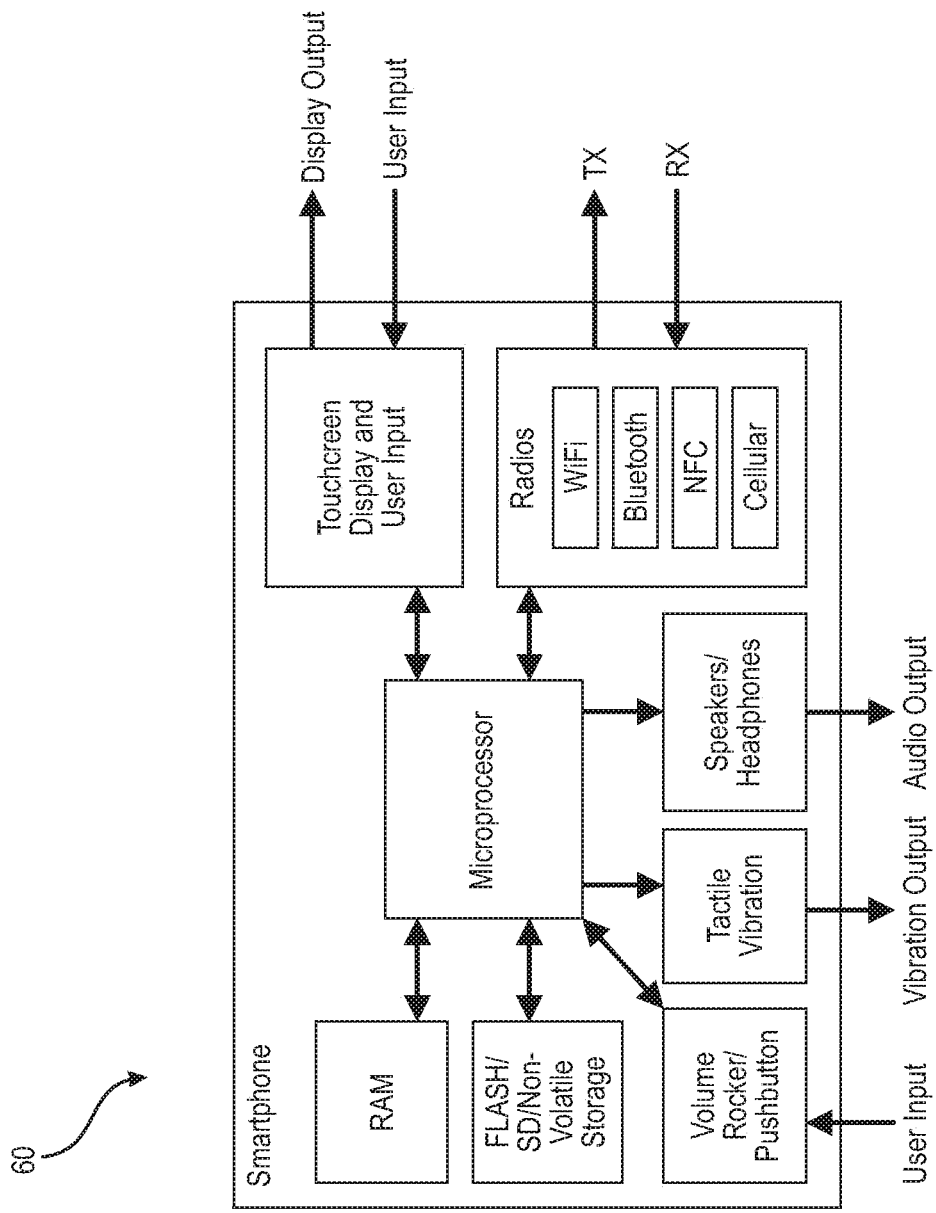
FIG. 8 is a diagram view of typical smartphone internal components.

Referring now to FIG. 8, a diagram is provided of a typical smartphone 60 including: a microprocessor; volatile (RAM) and non-volatile (FLASH/SD) storage; user inputs (touchscreen, volume rockers, and pushbuttons); visual output devices (display); visual output devices (speakers and headphone 10 jacks); tactile output devices (vibration unit); and various wireless radios (WiFi, Bluetooth, NFC, and cellular). The smartphone app is stored in non-volatile storage on the smartphone and executed via the microprocessor. The smartphone app utilizes the smartphone radios to communicate with the control hub 20 and the visual, audible, and tactile inputs/outputs to communicate with the user.

Figure 9B:
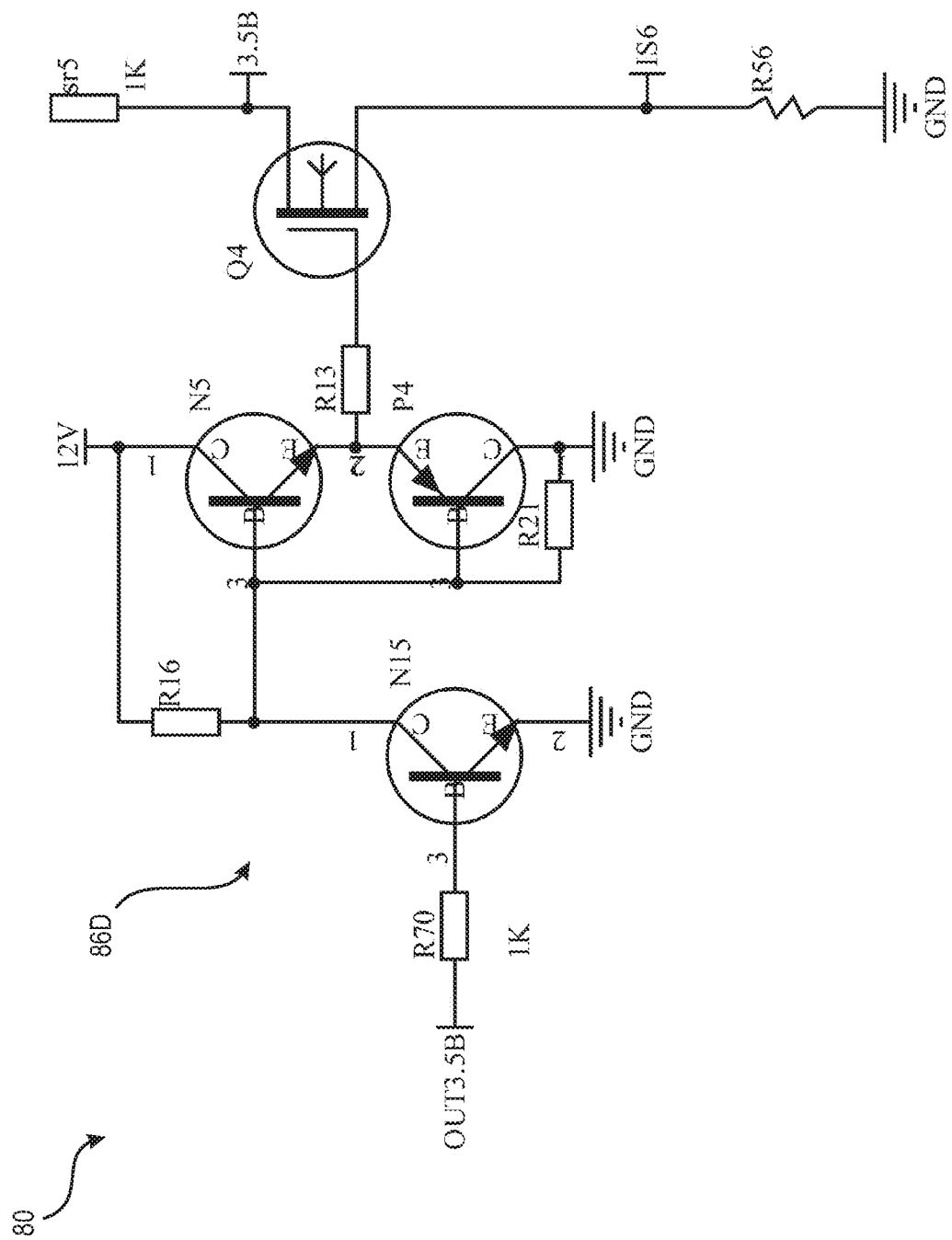
FIGS. 9A(1), 9A(2), 9A(3), 9B, 9C(1), 9C(2), 9D(1), 9D(2), 9E, 9F(1), 9F(2), 9G(1), 9G(2), and 9H are schematics of another embodiment of the present light control system, featuring a smartphone as the remote control unit.
Figure 9E:
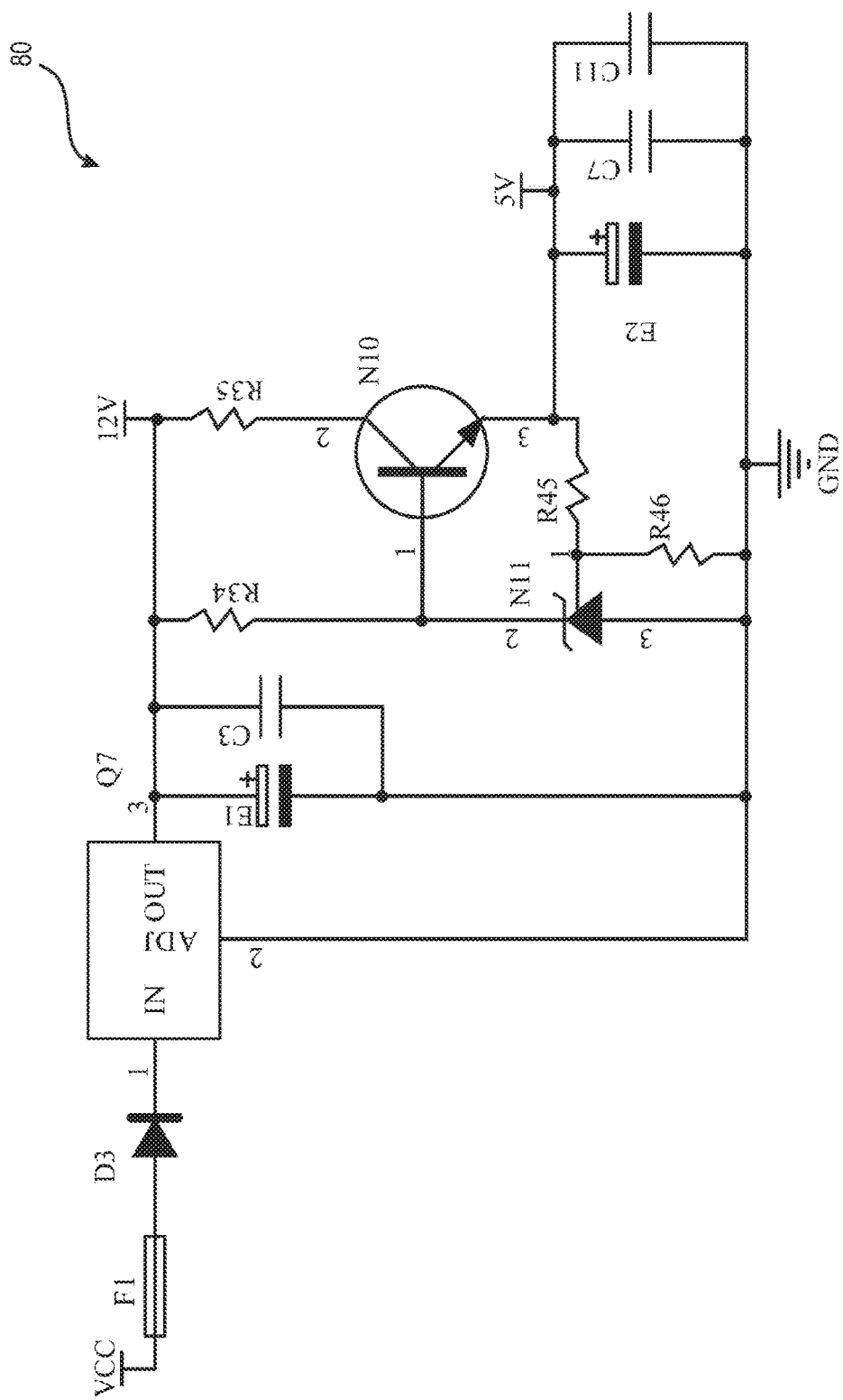
Figure 9H:
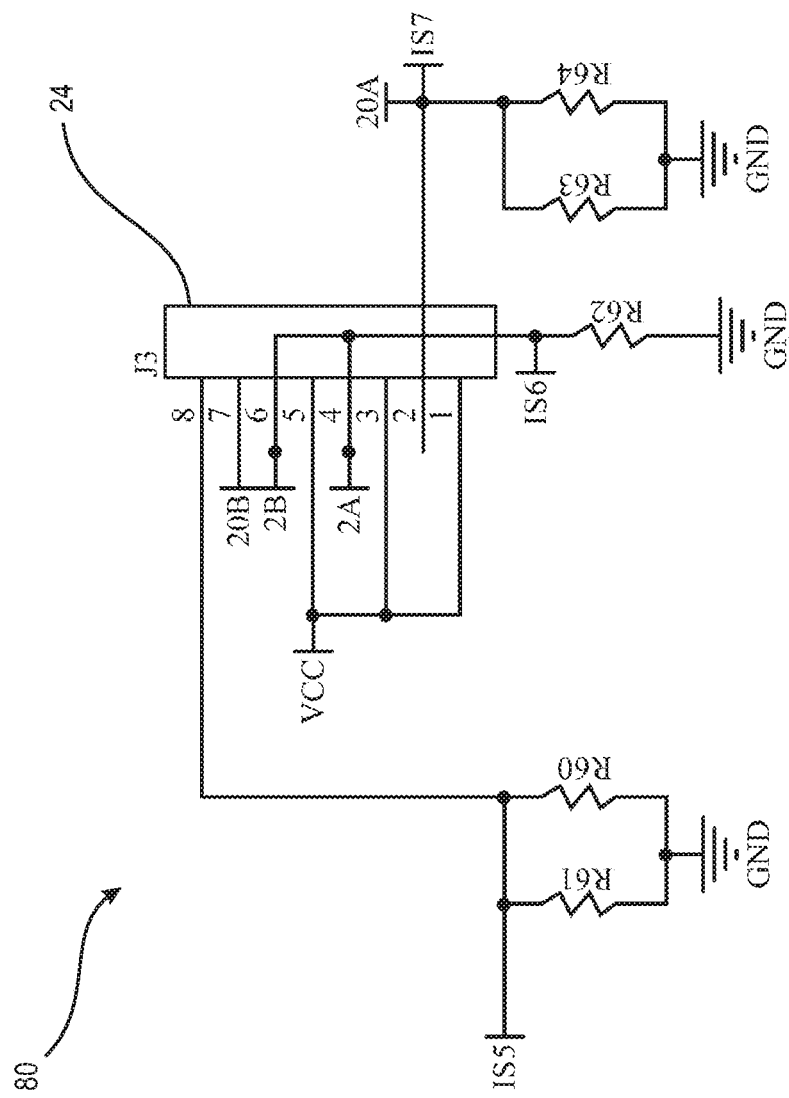

FIGS. 9A(1), 9A(2), 9A(3), 9B, 9C(1), 9C(2), 9D(1), 9D(2), 9E, 9F(1), 9F(2), 9G(1), 9G(2), and 9H show an alternate embodiment of the control hub 80 which is particularly suited to operate in conjunction with a smartphone 60 running the smartphone app. This embodiment is particularly suited for use with a smartphone 60 in that it utilizes a Bluetooth controller 82 which is capable of communicating with the smartphone 60 via Bluetooth communication.

Additionally, FIGS. 9A(1), 9A(2), 9A(3), 9B, 9F(1), 9F(2), and 9G(1) contain overload protection circuits 84A-84C, which shuts down the power to a particular auxiliary light circuit 86A-86D in the event of an overcurrent condition. In this particular embodiment, auxiliary light circuits 86A and 86C are designed to provide 5 amps of current each to connected auxiliary lights 12, whereas auxiliary light circuits 86B and 86D are designed to provide 20 amps and 3.5 amps respectively. In the event that an overload protection circuit 84A-84C detects current higher than the designed current, the overload protection circuit will shut down power to the particular auxiliary lighting circuit 86A-86D. FIG. 9C(2) also shows an overheating circuit 88 which monitors the temperature of the control hub 80. Other elements of the control hub 80 that are shared with the control hubs 20 and 40 are identified with identical reference numbers.

Another feature of the present auxiliary lighting control system 14 is that warning/strobe lights can be connected and operated with the remote control function (implemented either as a remote control unit 30 or smartphone app installed on a smartphone 60). The same process is used to connect the negative and positive wires; however, these units typically have a third wire that is for pattern selection. Patterns are available for each warning light 12 that provide the user with a strobe or blinking pattern that makes the light more visible to others in various weather conditions. In conventional applications, to choose the pattern on these warning lights, the user typically presses a button on the unit's plug that advances the pattern selection through a number of choices. Since the plug is eliminated in the installation process utilizing the present auxiliary lighting system 14, the pattern selection process is accomplished by simply touching the pattern wire onto the active terminal to advance the light to the flash pattern desired. Once chosen, the pattern wire is simply taped and zip-tied to the harness, where it can remain available to change patterns in the future, if desired by the user.

In addition, the remote control 30 optionally includes a connection point where the pattern wires can be connected and a pattern button on the remote control is used to advance the pattern without manually touching the pattern wires to the active terminal.

While particular embodiments of the present auxiliary vehicle lighting control system have been described herein, it will be appreciated by those skilled in the art that changes and modifications may be made thereto without departing from the invention in its broader aspects and as set forth in the following claims.

The invention claimed is:

1. An auxiliary vehicle lighting control system for use in a vehicle having an engine, an electrical system, and an auxiliary vehicle light, the auxiliary vehicle lighting control system comprising:
   a control hub configured to be communicatively connected to the electrical system and to the auxiliary vehicle light; and
   a timer for monitoring a duration of time between a present moment and a second moment when a most recent wireless transmission was received at the control hub;
   a system shut down function or program configured for de-energizing the auxiliary vehicle light, the auxiliary vehicle lighting control system constructed and arranged so that upon illumination of the auxiliary vehicle light, and the engine turned off, vehicle battery voltage is monitored, and upon the battery voltage reaching a designated target, the system shut down function or program de-energizes the auxiliary vehicle light,
   wherein upon the auxiliary vehicle light being de-energized, the vehicle engine must be turned on for the auxiliary vehicle light to be re-energized, the timer being configured to trigger the system shut down function or program when the duration of time reaches a timeout duration.

2. The auxiliary vehicle lighting control system of claim 1, wherein the shut down function or program is activated upon the battery voltage reaching 9.8 Volts DC±0.3 Volts DC.

3. The auxiliary vehicle lighting control system of claim 1, wherein the auxiliary vehicle light is re-energized only upon user activation.

4. The auxiliary vehicle lighting control system of claim 1, wherein the timeout duration is equal to approximately forty-eight hours.

5. The auxiliary vehicle lighting control system of claim 1, further comprising a remote control unit having a software application implemented on a smartphone and a transceiver in communication with the control hub.

6. The auxiliary vehicle lighting control system of claim 5, the timeout duration being adjustable, wherein:
the timeout duration is set to a desired value via the software application;
the desired value is transmitted to the control hub via the transceiver; and
the control hub sets the timeout duration to the desired value.

7. The auxiliary vehicle lighting control system of claim 5, wherein a smartphone alert is triggered audibly, visibly, or via tactile annunciation on the smartphone for at least one selected from the group consisting of:
an inadvertent auxiliary light circuit energization event;
a vehicle electrical system low voltage event; and
a communication connection or disconnection with the control hub.

8. The auxiliary vehicle lighting control system of claim 1, wherein the control hub comprises:
a terminal block for connection to the auxiliary vehicle light;
a fuse corresponding to the terminal block and protecting the auxiliary vehicle light connected to the terminal block.

9. The auxiliary vehicle lighting control system of claim 8, wherein the control hub further comprises additional accessible terminal blocks for connecting additional auxiliary vehicle lights thereto.

10. The auxiliary vehicle lighting control system of claim 1, further comprising a monitor which measures a voltage level of the vehicle electrical system.

11. The auxiliary vehicle lighting control system of claim 10, wherein the monitor triggers the system shut down function or program if the voltage level reaches a low voltage level.

12. The auxiliary vehicle lighting control system of claim 10, wherein there is a delay period between vehicle engine ignition and activation of the monitor.

13. The auxiliary vehicle lighting control system of claim 12, wherein the delay period is approximately 8 seconds.

14. The auxiliary vehicle lighting control system of claim 1, further comprising an overload protection circuit configured to shut down power to the auxiliary vehicle light when an overcurrent condition occurs.

15. An auxiliary vehicle lighting control system for use in a vehicle having an engine, an electrical system, and an auxiliary vehicle light, the auxiliary vehicle lighting control system comprising:
a control hub configured to be communicatively connected to the vehicle electrical system and to the auxiliary vehicle light;
a timer for monitoring a duration of time between a present moment and a second moment when a most recent wireless transmission was received at the control hub;
a system shut down function or program connected to the control hub and configured for de-energizing the auxiliary vehicle light, the timer being configured to trigger the system shut down function or program when the duration of time reaches a timeout duration; and
a remote control unit having a software application implemented on a smartphone and a transceiver in communication with the control hub,
the control hub being constructed and arranged so that:
upon illumination of the auxiliary vehicle light, and the engine being turned off, vehicle battery voltage is monitored,
upon the battery voltage reaching a designated target, the system shut down function or program de-energizes the auxiliary vehicle light, and
upon the auxiliary vehicle light being de-energized, the engine must be turned on for the auxiliary vehicle light to be re-energized,
wherein the auxiliary vehicle light is re-energized only upon user activation via the remote control unit.

16. The auxiliary vehicle lighting control system of claim 15, wherein the remote control unit is further configured to de-energize and dim the auxiliary vehicle light.

17. The auxiliary vehicle lighting control system of claim 15, wherein the remote control unit is further configured to generate an alert if the auxiliary vehicle light is left in an energized state for a predetermined amount of time.

18. An auxiliary vehicle lighting control system for use in a vehicle having an engine, an electrical system, and an auxiliary vehicle light, comprising:
a control hub configured to be communicatively connected to the electrical system and to the auxiliary vehicle light;
a system shut down function or program connected to the control hub and configured for de-energizing the auxiliary vehicle light, the control hub constructed and arranged so that upon illumination of the auxiliary vehicle light, and the engine turned off, vehicle battery voltage is monitored, and upon the vehicle battery voltage reaching 9.8 Volts DC±0.3 Volts DC, the system shut down function or program de-energizes the auxiliary vehicle light, wherein upon the auxiliary vehicle light being de-energized, the engine must be turned on for the auxiliary vehicle light to be re-energized;
a remote control unit arranged with a series of controls corresponding to at least one of energization, de-energization, and dimming of the auxiliary vehicle light, the remote control unit comprising a software application implemented on a smartphone;
a transceiver for wireless communication with the control hub, the transceiver comprising a smartphone radio in communication with the control hub; and
a timer for monitoring a duration of time between a present moment and a second moment when a most recent wireless transmission was received from the remote control unit at the control hub, the timer being configured to trigger the system shut down function or program when the duration of time reaches an adjustable timeout duration, the adjustable timeout duration being set to a desired value via the software application and transmitted to the control hub via the smartphone radio.

\* \* \* \* \*